(12) United States Patent
Wild et al.

(10) Patent No.: US 6,851,326 B2
(45) Date of Patent: Feb. 8, 2005

(54) CONTROL DEVICE FOR A SEMIAUTOMATIC GEARSHIFT MECHANISM OF VEHICLES, PREFERABLY MOTOR VEHICLES

(75) Inventors: Andreas Wild, Unterensingen (DE); Thomas Claus, Ulm (DE); Alfred Trzmiel, Grafenberg (DE); Roland Meyer, Roth (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 10/102,551

(22) Filed: Mar. 19, 2002

(65) Prior Publication Data

US 2002/0152823 A1 Oct. 24, 2002

(30) Foreign Application Priority Data

Mar. 19, 2001 (DE) .......................................... 101 13 161

(51) Int. Cl.[7] .......................... F16H 59/00; F16H 61/00; F16H 63/00
(52) U.S. Cl. ........................................ 74/335; 74/337.5
(58) Field of Search ................................ 74/335, 473.1, 74/473.11, 473.13, 337.5, 340

(56) References Cited

U.S. PATENT DOCUMENTS

| | | | | |
|---|---|---|---|---|
| 4,633,987 A | * | 1/1987 | Rogner et al. | ................. 74/745 |
| 5,138,905 A | * | 8/1992 | Kouno | ......................... 477/80 |
| 5,722,297 A | * | 3/1998 | Tischer et al. | ............ 74/473.21 |
| 5,916,326 A | * | 6/1999 | Tischer | ......................... 74/335 |
| 6,497,160 B2 | * | 12/2002 | Meyer et al. | ................. 74/335 |

FOREIGN PATENT DOCUMENTS

JP          59001851 A   *   1/1984   ............. F16H/5/12

* cited by examiner

*Primary Examiner*—Tisha Lewis
(74) *Attorney, Agent, or Firm*—Gudrun E. Huckett

(57) ABSTRACT

A control device for semiautomatic gearshifting mechanisms of motor vehicles has a selector shaft of a gearshifting mechanism and at least one rotatable shifting element acting on the selector shaft so as to rotate and axially move the selector shaft for selecting a gutter and shifting a gear. A switching valve actuates the at least one shifting element for rotating the selector shaft and for axially moving the selector shaft. The shifting element is a shift drum with at least one control curve. The control curve is a groove in the mantle of the shifting element. The control device provides a simplified hydraulic control of the switching valves and has a simplified configuration.

38 Claims, 22 Drawing Sheets

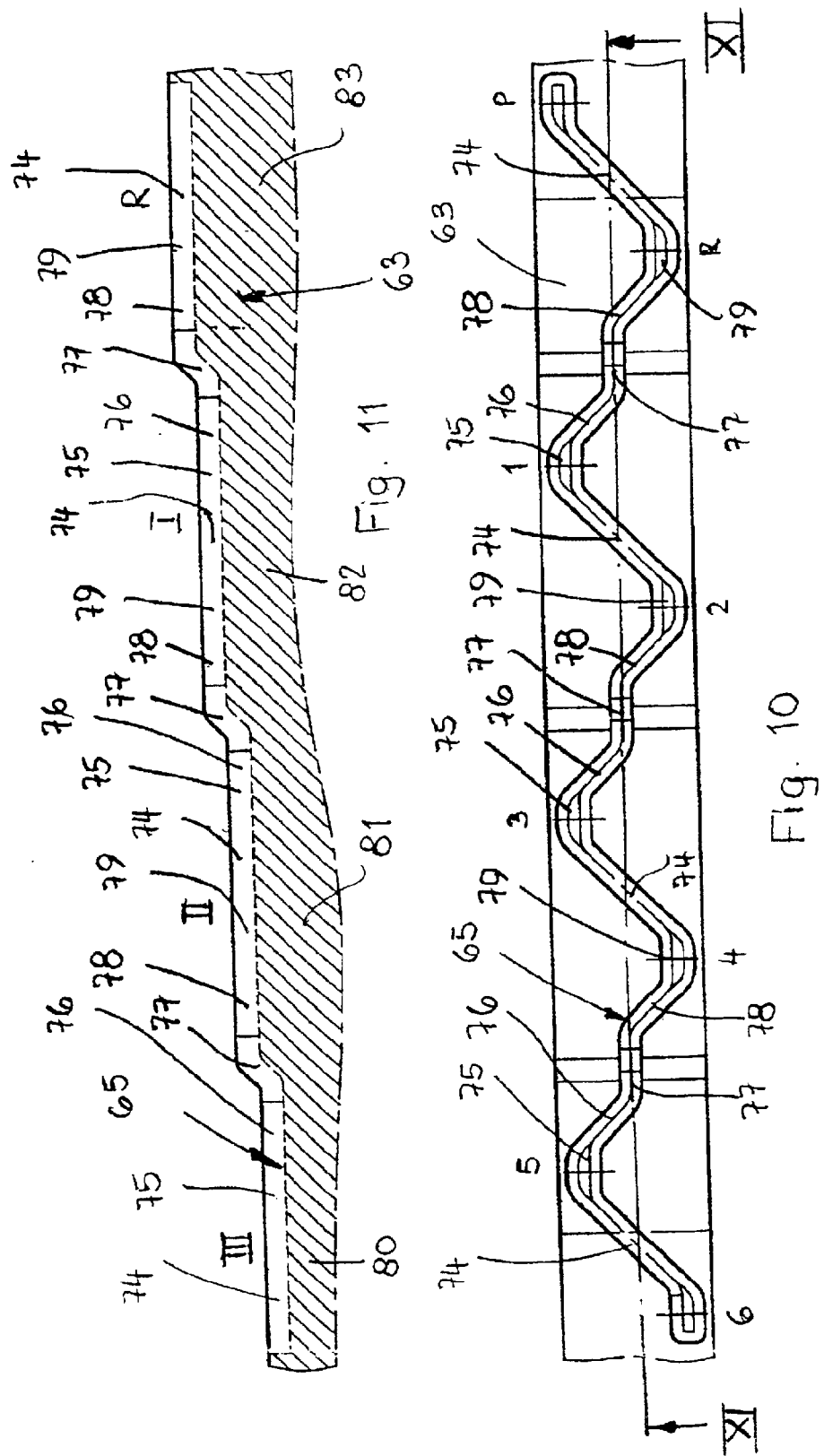

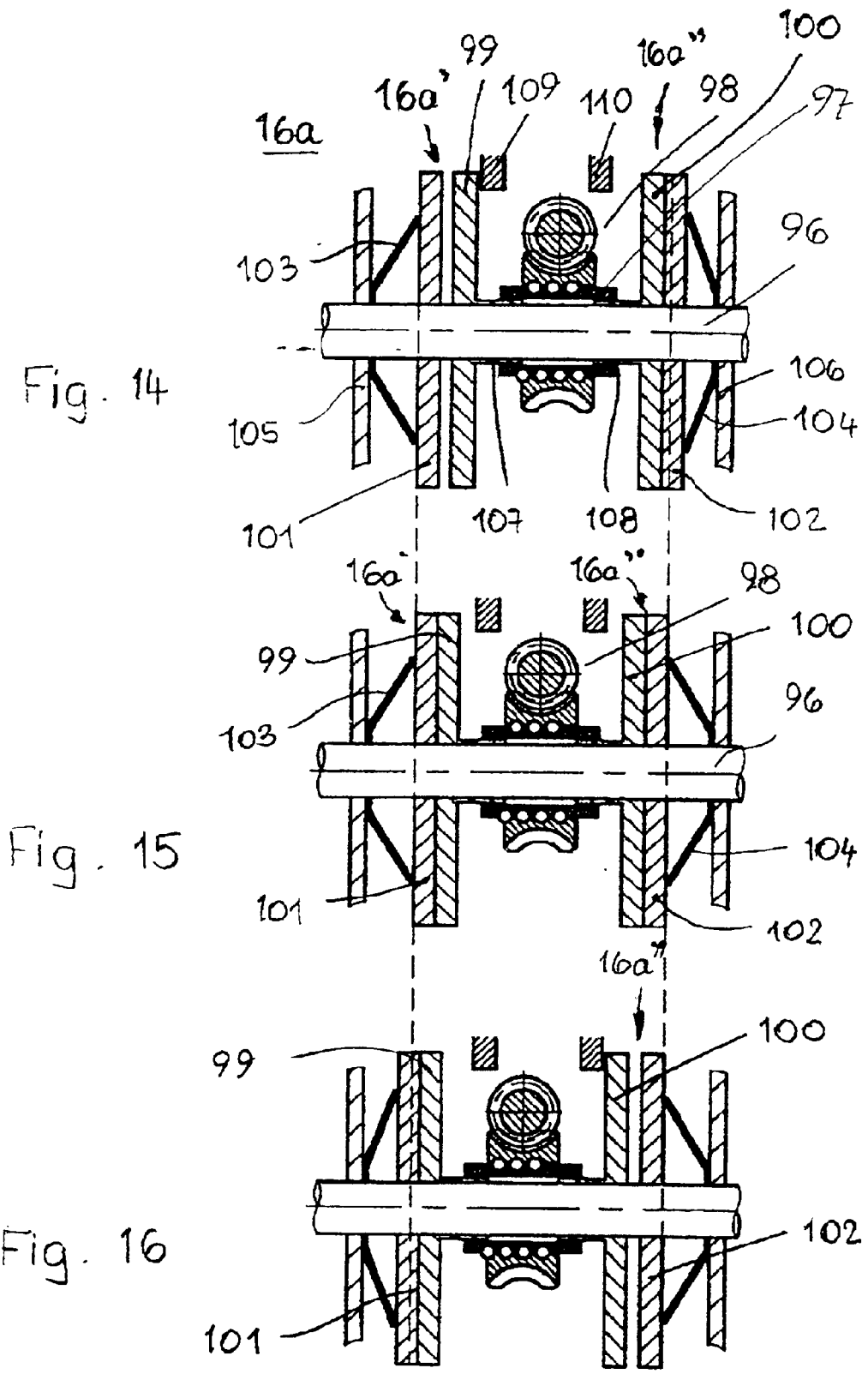

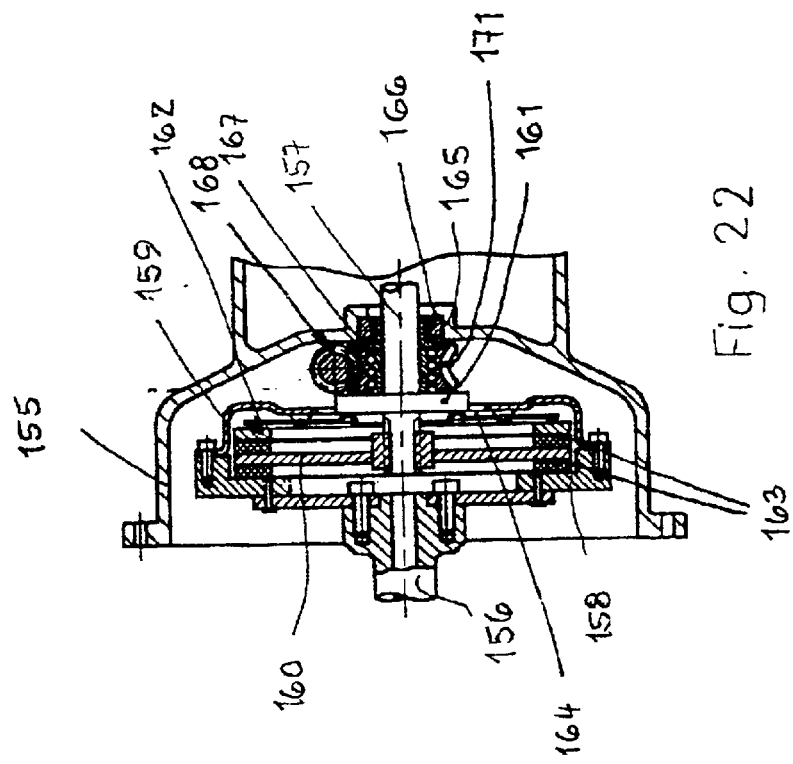
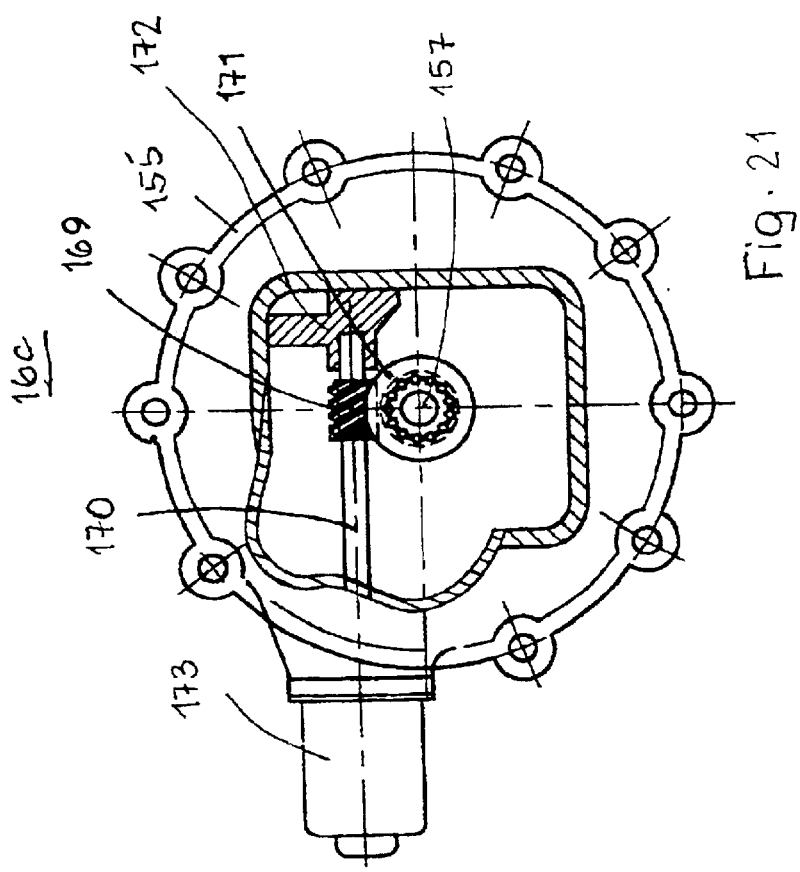

CONTROL DEVICE FOR A SEMIAUTOMATIC GEARSHIFT MECHANISM OF VEHICLES, PREFERABLY MOTOR VEHICLES

BACKGROUND OF THE INVENTION

1. Field of the Invention

The invention relates to a control device for semiautomatic gearshift mechanisms of vehicles, preferably motor vehicles, comprising at least one rotatable shifting element with which a selector shaft of the gearshift mechanism can be rotated and axially moved for selecting the gutter and shifting the gears.

2. Description of the Related Art

In order to select a gutter and shift a gear by means of the gearshift mechanism, the selector shaft of the gearshift mechanism must be correspondingly rotated and axially moved. In this connection, in known gearshift mechanisms a shifting element is provided whose movements are transmitted onto the selector shaft. Several valves are required for the longitudinal and rotational movement in order to actuate the shifting element correspondingly. Accordingly, this control device has a complex configuration. The large number of valves requires a complex hydraulic control.

SUMMARY OF THE INVENTION

It is an object of the present invention to configure the control device of the aforementioned kind such that it enables an optimal operation of the gearshift mechanism while providing a simple constructive configuration.

In accordance with the present invention, this is achieved in that only one valve is provided with which the shifting element can be actuated for rotating and axially moving the selector shaft, respectively.

In the control device according to the present invention only two valves are required in order to generate the required movements of the selector shaft for gutter selection and gear shifting. This provides a constructively simple configuration of the control device. The hydraulic control of the valves can thus be simplified.

BRIEF DESCRIPTION OF THE DRAWING

In the drawing:

FIG. 10 shows a developed view of a control curve of the shift drum according to FIGS. 7 through 9;

FIG. 11 is a section along the line XI—XI in FIG. 10;

FIG. 14 shows in section the initial position of a twin clutch which can be actuated by the control device;

FIG. 15 shows the twin clutch according to FIG. 14 in a middle position;

FIG. 16 shows the twin clutch according to FIG. 14 in a coupling position;

FIG. 21 shows a clutch for use in the control device according to the invention partially in an end view and partially in section;

FIG. 22 shows the clutch according to FIG. 21 in an axial section;

DESCRIPTION OF THE PREFERRED EMBODIMENTS

Figure 1:
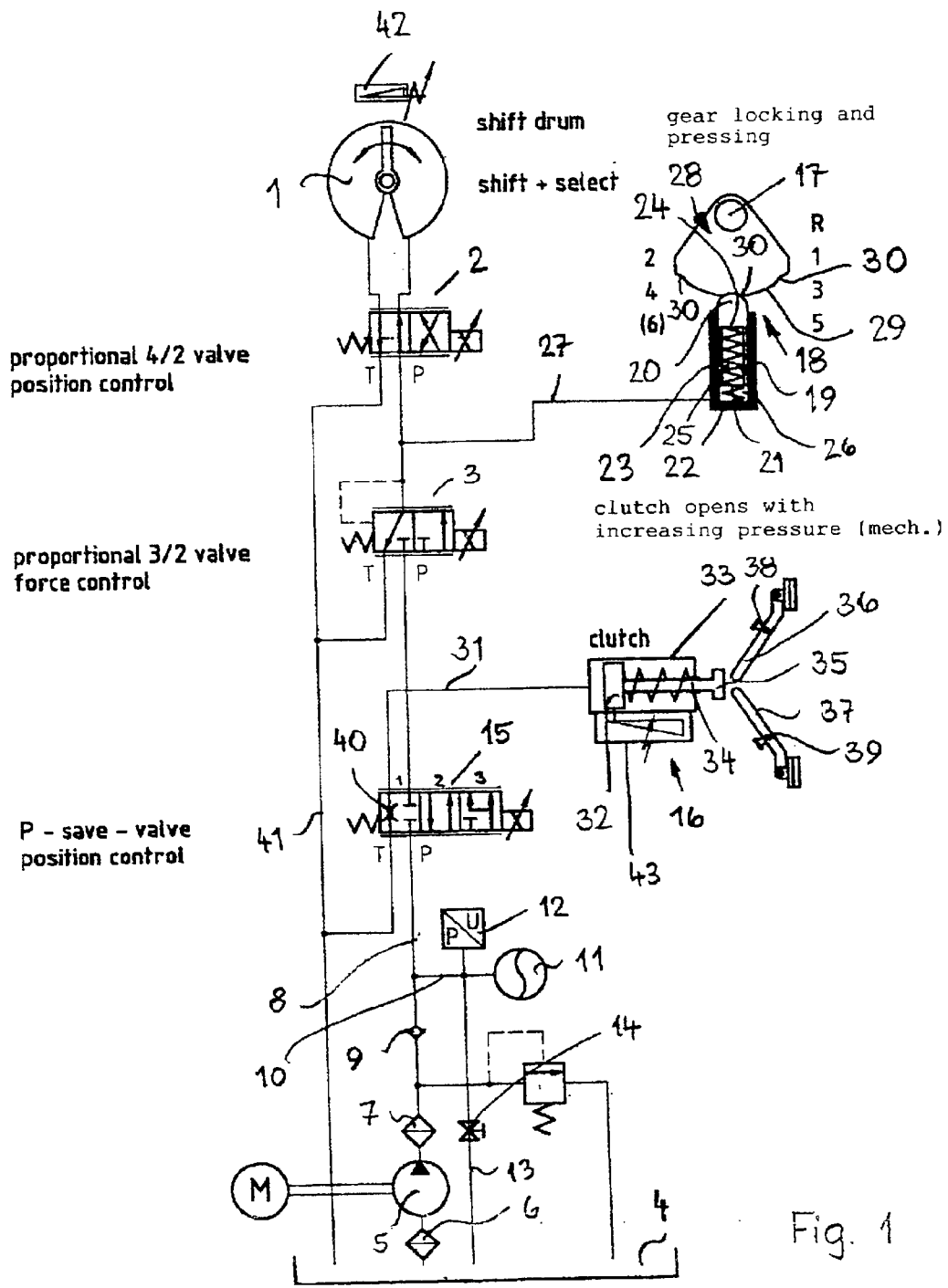
FIG. 1 is a hydraulic control diagram of a control device according to the invention.

The control device is provided for a semiautomatic gearshift mechanism (gearbox) of motor vehicles. The driver of the motor vehicle can move the gearshift lever by means of a conventional mechanical gearshift mechanism. However, he must not actuate the clutch because this is carried out automatically by the control device. FIG. 1 shows a control device with a shift drum 1 which has arranged upstream thereof a 4/2 proportional directional control valve 2. Upstream of the latter, a proportional pressure control valve 3 is provided. The hydraulic medium is removed from a tank 4 by means of a pump 5 which has arranged upstream and downstream thereof a filter 6 and 7, respectively. In the pump line 8 a check valve 9 is positioned behind the filter 7 and closes in the direction to the tank 4. Behind the check valve 9, a transverse line 10 branches off the pump line 8 and is connected to a pressure reservoir 11 for the hydraulic medium. The pressure in the pressure reservoir 11 is measured by a corresponding pressure gauge 12. A tank line 13 branches off the transverse line 10. A shut-off valve 14 is positioned in the tank line 13 and can be opened for emptying the pressure reservoir 11 so that the hydraulic medium can return from the pressure reservoir 11 via the tank line 13 to the tank 4.

The pump line 8 is connected to a pressure safety valve 15 which is arranged upstream of the 3/2 proportional pressure control valve 3.

A clutch 16 of the motor vehicle is hydraulically actuated and configured such that it opens with increasing pressure.

In order to shift a gear or to change a gear, first the pressure safety valve 15 is opened so that the hydraulic medium can flow from the pump 5 via the pump line 8 and the opened pressure safety valve 15 to the proportional pressure control valve 3 which has been switched from the switching position illustrated in FIG. 1. The proportional directional control valve 2 arranged downstream is switched such that the shift drum 1 can be rotated in the desired direction. Only when this valve 2 is switched correspondingly, the proportional pressure control valve 3 is opened. The pressurized hydraulic medium then rotates the shift drum 1 in the desired direction. The shift drum 1, as will be explained in more detail in the following, is connected with a selector shaft 17 of the gearshift mechanism such that the shift drum 1 rotates or axially moves the selector shaft 17 correspondingly.

As soon as the desired gear of the gearshift mechanism has been shifted, the proportional directional control valve 2 is moved into the control position. This switching of the valve 2 is realized shortly before the selector shaft 17 has reached the desired end position. This has the advantage that first, while the valve 2 is fully open, the selector shaft 17 can be moved quickly from its respective position in the direction toward the new position. Only shortly before reaching this new position, the selector shaft 17 is moved into the desired position, without overshooting, by switching the valve 2 into the control position.

In order for the selector shaft 17 to reach the end position independent of tolerances in the shift drum and/or in the gearshift mechanism, a locking device 18 is provided. The locking device 18 has at least one locking bolt 19 whose free end 20 has a spherical cup shape. The locking bolt 19 is loaded by the force of at least one pressure spring 21. The spring 21 is supported with one end on the bottom 22 of cup-shaped housing 23 and with the other end on the bottom 24 of a central recess 25 of the locking bolt 19. The housing 23 delimits together with the locking bolt 19 a pressure chamber 26. A line 27 which branches off the pump line 8 opens into the pressure chamber 26. Via the transverse line 27 the hydraulic medium reaches the pressure chamber 26 and loads the locking bolt 19 in the direction of its locking position. With the additional hydraulic pressure loading it, the locking bolt 19 is forced reliably into its locking position, independent of the gearshift mechanism tolerances that may be present. A locking counter member 28 is seated fixedly on the selector shaft 17 and has the shape of a sector of a circle. The curved end face 29 has three locking depressions 30 positioned at a spacing to one another. The locking bolt 10, depending on the rotational position of the selector shaft 17, engages the locking depressions 30. In the illustrated embodiment, the selector shaft 17 can be rotated into three positions so that correspondingly three locking depressions 30 are provided. Should the selector shaft 17 not reach its exact position within the shifted gear position, it is ensured, as a result of the hydraulic pressure loading of the locking bolt 19, that the selector shaft 17 is rotated by the locking counter member 28 into the precise position in which the locking bolt 19 engages the corresponding locking depression 30.

As soon as the respective rotational position of the selector shaft 17 has been reached, the pressure control valve 3 can be closed so that the supply of the hydraulic medium to the line 27 is shut off and the locking bolt 19 is no longer subjected to the hydraulic force. The selector shaft 17 is then positioned only by the minimal force of the pressure spring 21 acting on the locking bolt 19.

In order to open the clutch 16 of the motor vehicle, the pressure safety valve 15 is moved into the switching position 15-3. The hydraulic medium flowing via the pump line 8 reaches accordingly the clutch line 31 so that a clutch piston 32 in a clutch cylinder 33 is loaded by the hydraulic medium and the clutch 16 is opened in the way known in the art. The clutch 16 is configured such that it opens with increasing pressure. For this purpose, on a piston rod 34 outside of the clutch cylinder 33 a piston-shaped pressure element 35 is provided which presses onto the free ends of a two-armed lever which are thus pivoted in opposite direction to one another about the respective bearing axes 38, 39.

The pressure safety valve 15 is configured, as is known in the art, such that it controls the position of the piston 32 and thus also the torque transmission of the clutch 16. In the switching position 15-1 of the pressure safety valve 15, the clutch line 31 is connected by a throttle 40 to a tank line 41 via which the hydraulic medium can flow back to the tank 4.

The respective rotational position of the shift drum 1 is detected by a rotational angle sensor 42 which sends corresponding signals to a control unit (not illustrated). The clutch 16 is provided with a rotational travel sensor 43 which is also connected to this control unit and with which the travel stroke of the clutch piston 32 can be measured.

In order to shift or change a gear of the gearshift mechanism (gearbox), first the pressure safety valve 15 is opened so that via the pressure line 8 the hydraulic medium flows from the tank 4 in the direction toward the shift drum 1. The valve 2 is switched such that the shift drum 1 is rotated in the desired direction. Then the pressure control valve 3 is opened so that the hydraulic medium reaches via the valve 2 the shift drum 1 which is rotated by means of the pressurized hydraulic medium in the required direction so that the selector shaft 17 which is connected fixedly with the shift drum 1 is rotated or moved by the desired amount.

Figure 2:
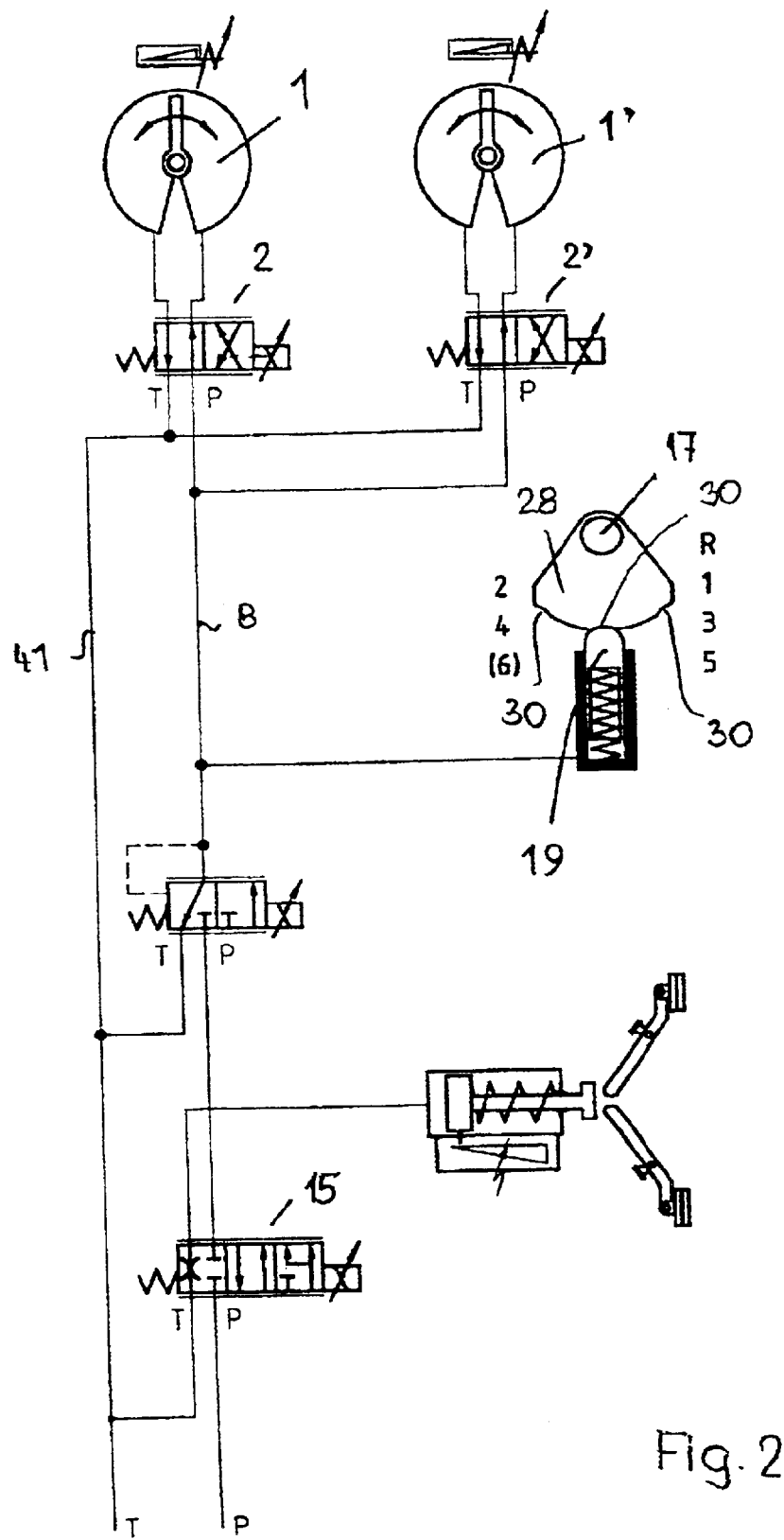
FIG. 2 shows in an illustration corresponding to FIG. 1 a second embodiment of the control device according to the invention.

In the embodiment according to FIG. 2 two separate shift drums 1, 1' are provided for selecting the gutter and the gears. They have arranged upstream thereof a directional control valve 2, 2', respectively. These two valves 2, 2' are arranged in the pressure line 8 or in the tank line 41. Otherwise, this embodiment is identical to that of FIG. 1.

When rotating the shift drum 1 about its axis, the respective gear is shifted while, when rotating the shift drum 1' about its axis, the corresponding gutter of the gearshift mechanism is selected. The two valves 2, 2' are switched temporally in sequence so that first the gutter is selected and subsequently the desired gear is shifted within the selected gutter. Accordingly, the control of the valves 2, 2' is realized by a corresponding control unit (not illustrated). The selector shaft 17 of this gearshift mechanism also has the three locking depressions or recesses 30 for the locking bolt 19.

Corresponding to the preceding embodiment, the locking counter member 28, which is fixedly connected to the selector shaft, has three locking depressions 30 which are correlated with the three gutters of the gearshift mechanism.

The locking counter member 28 is so thick that upon axial movement of the selector shaft 17 it is always in engagement with the locking bolt 19. Accordingly, the locking depressions 30 in the embodiment according to FIGS. 1 and 2 are groove-shaped, axis-parallel recesses.

Figure 3:
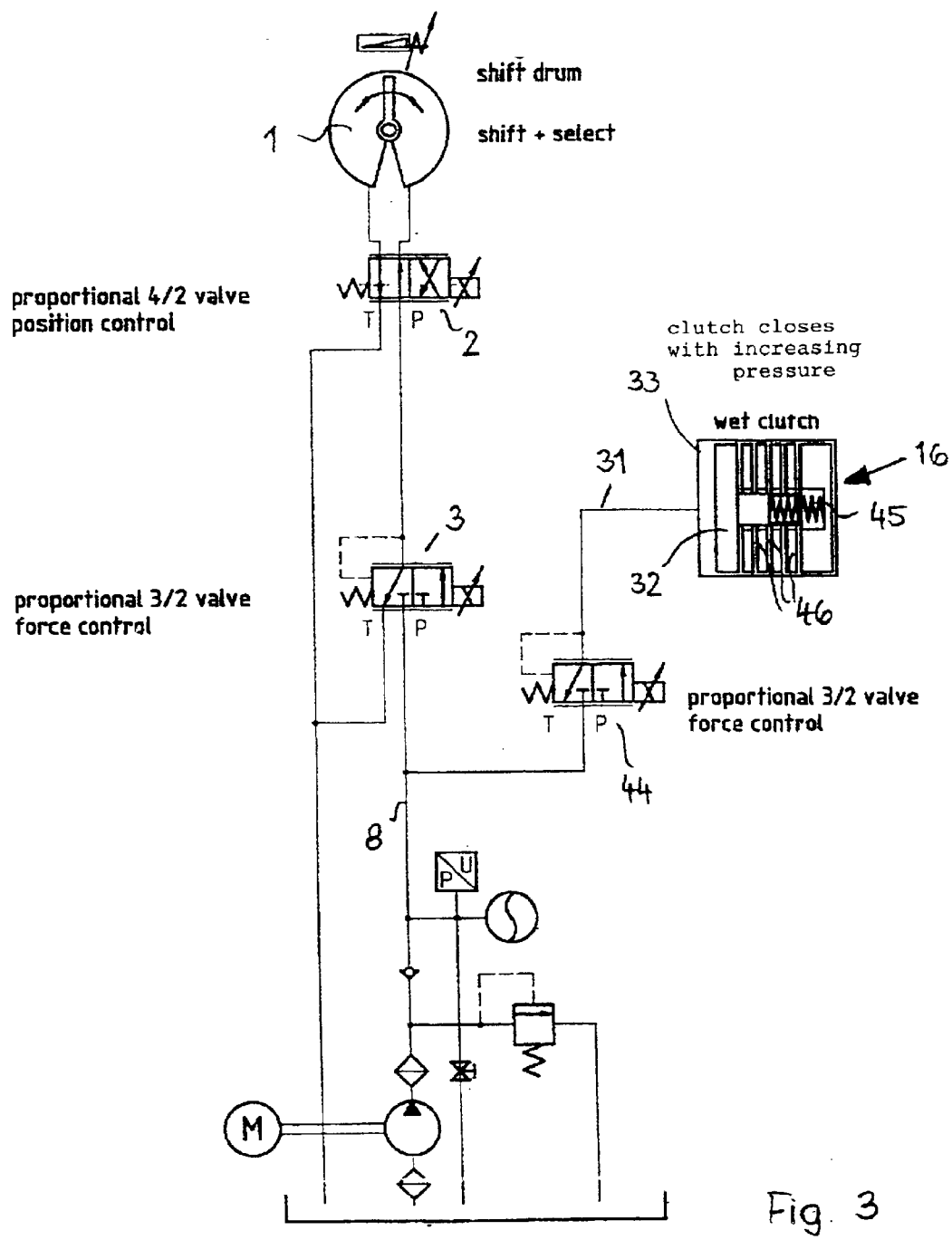
FIG. 3 shows in an illustration corresponding to FIG. 1 a third embodiment of the control device according to the invention.

In the embodiment according to FIG. 3, only a single shift drum 1 is provided with which the gutters of the gearshift mechanism can be selected and the gears shifted in a way to be described in the following. This embodiment differs from the embodiment according to FIG. 1 only in that the clutch 16 is a wet clutch which closes with increasing pressure. The clutch 16 has arranged upstream thereof a pressure control valve 44; in the shown embodiment this is a 3/2 proportional pressure control valve which is arranged in the clutch line 31. When the valve 44 is open, the hydraulic medium can flow via the pressure line 8 and the clutch line 31 into the clutch cylinder 33 in which the hydraulic medium loads the clutch piston 32. In this way, the clutch piston 32 is moved against the force of the pressure spring 45 to the right in FIG. 3 so that the clutch discs 46 are firmly pressed against one another. In contrast to the two preceding embodiments, the clutch 16 is closed with increasing pressure of the hydraulic medium. The pressure control valve 44 controls in a way known in the art the torque to be transmitted by the clutch 16.

The gutter selection as well as the gear shifting of the gearshift mechanism is carried out in this embodiment in the same way as explained in connection with FIG. 1. The single shift drum 1 is thus provided for gutter selection as well as gear shifting. The pressure control valve 15 of the two preceding embodiments is not provided in the embodiment according to FIG. 3, but, of course, can also be used in this configuration.

Figure 4:
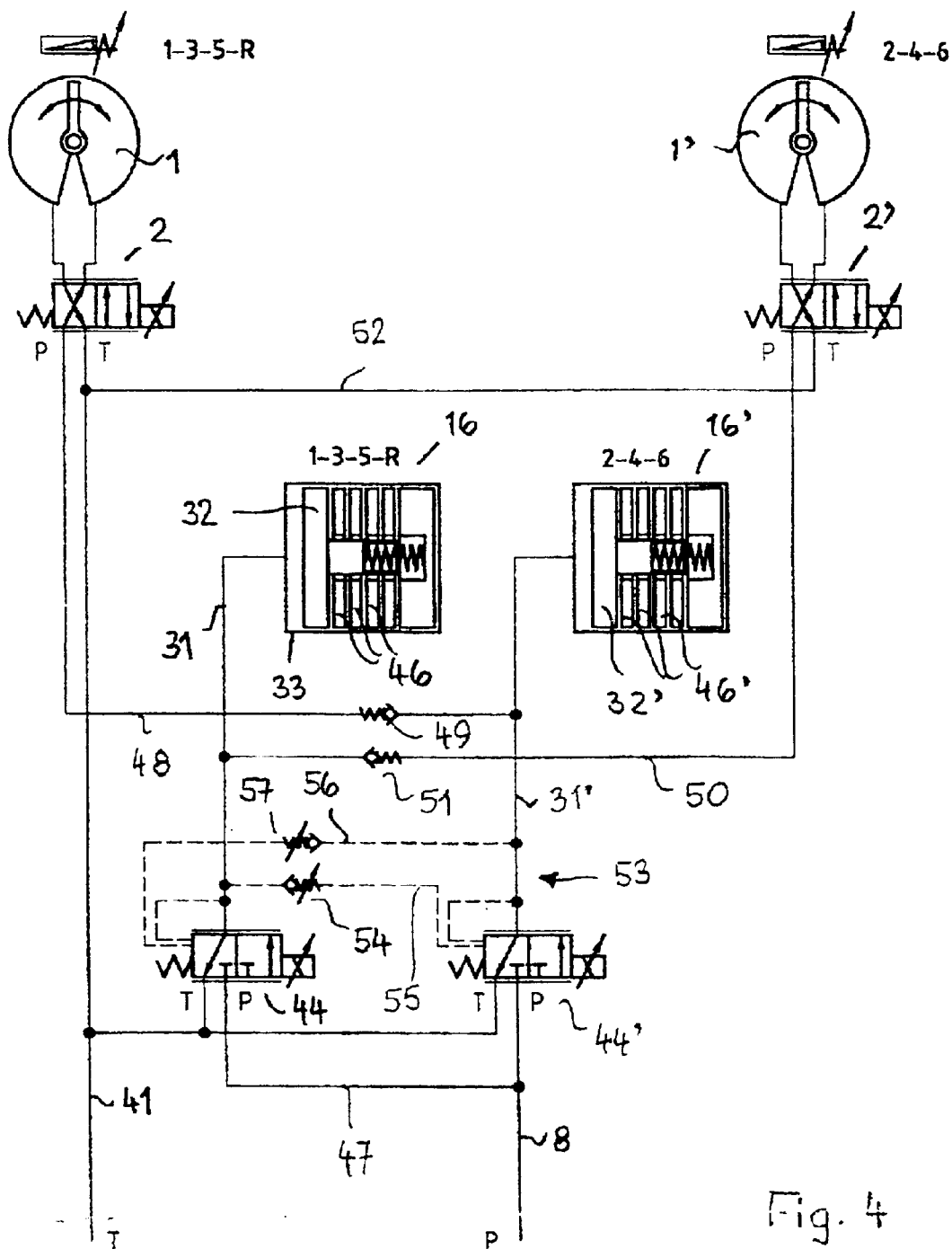
FIG. 4 shows in an illustration corresponding to FIG. 1 a fourth embodiment of a control device according to the invention.

In the embodiment according to FIG. 4, two shift drums 1,1' are provided with which the gears of the gearshift mechanism are shifted. The shift drum 1 serves, for example, for shifting the first, third, fifth and reverse gears (1-3-5-R) while the shift drum 1' is provided for shifting the second, fourth and sixth gears (2-4-6). A clutch 16, 16' is provided for each shift drum 1, 1' and is configured as a wet clutch in this embodiment, corresponding to the embodiment of FIG. 3. The clutches 16, 16' can however also be configured according to the embodiment of FIGS. 1 and 2. The shift drums 1, 1' have several shifting gates (not illustrated) engaged by corresponding selector forks (not illustrated) of the gearshift mechanism.

When, for example, a gear is shifted by means of the shift drum 1, the corresponding clutch 16 is open so that the clutch piston 32 is not loaded by the hydraulic medium. The hydraulic medium present within the clutch cylinder 33 of the clutch 16 flows via the clutch line 31 and the closed pressure control valve 44 into the tank line 41. The clutch 16', on the other hand, is closed during shifting by means of the shift drum 1 so that the hydraulic medium can flow via the pressure line 8 to the clutch 16' and can load its piston 32'. The clutch discs 46' of the clutch 16' are thus pressed firmly against one another.

The clutch 16' has arranged upstream thereof a pressure control valve 44' which is advantageously also a 3/2 proportional pressure control valve. This valve 44' is positioned in the pump line 8, wherein a line 47 branches off the pump line 8, viewed in the flow direction of the hydraulic medium, in front of the valve 44'. The pressure control valve 44 is arranged in the line 47. The valve 44' is connected via clutch line 31' with the clutch 16'. In the area between the valve 44' and the clutch 16', a pressure line 48 branches off the clutch line 31' and extends to the valve 2. A check valve 49 is arranged in the pressure line 48 and is configured to close in the direction toward the clutch 16'.

Correspondingly, a pressure line 50 branches off the clutch line 31 in the area between the valve 44 and the clutch 16 and extends to the valve 2'. A check valve 51 is arranged in the pressure line 50 and is configured to close in the direction toward the clutch 16.

When, for example, by means of the shift drum 1 a gear is shifted, the corresponding wet clutch 16' is open. The other wet clutch 16 is then closed, i.e., the corresponding pressure control valve 44 is open. Accordingly, the drive of the motor vehicle is realized by the gear shifted with the shift drum 1'. As soon as a new gear is shifted on the shift drum 1, the clutch 16' is closed and the clutch 16 is correspondingly opened. This simultaneous opening and closing of the two wet clutches 16, 16' results in that the torque to be transmitted cannot drop to zero and the torque is instead only reduced by a certain amount.

Depending on which shift drum 1, 1' is to be actuated, the pressure control valve 44 or the pressure control valve 44' is closed. When the shift drum 1' is to be actuated, the pressure control valve 44 is switched from the position illustrated in FIG. 4 so that the hydraulic medium reaches the clutch line 31 via the pump line 8, the line 47, and the switched valve 44. The clutch piston 32 of the clutch 16 is loaded in this way with the hydraulic medium so that the clutch discs 46 are pressed tightly against one another. Via the pressure line 50 the pressurized hydraulic medium flows to the shift drum 1'. The valve 2' is switched corresponding to the desired rotational direction of the shift drum 1'. By rotation of the shift drum 1' the hydraulic medium is returned via the tank line 52 to the tank line 41. The pressure control valve 44' is in the position illustrated in FIG. 4 so that the clutch 16' is no longer under pressure and opens.

The reverse conditions are present when the shift drum 1 is to be actuated.

In order to prevent that both clutches 16, 16' can be completely closed at the same time, a safety device 53 is provided. When, for example, the pressure control valve 44 is open, the clutch 16 is closed in the described way and the shift drum 1' is loaded in order to select the desired gear. The hydraulic pressure acting in the clutch line 31 acts via the check valve 54 of the safety device 53 onto the pressure control valve 44. For this purpose, a line 55 branches off the clutch line 31, in the flow direction behind the pressure control valve 44, and the check valve 54 is arranged in this line 55 which extends to the pressure control valve 44'. The pressurized hydraulic medium flowing via this line 55 ensures that the pressure control valve 54 cannot be completely opened. The check valve 54 is adjustable for this purpose so that the pressure control valve 44' can be opened only to the adjusted amount determined by the check valve 54.

In the same way, a line 56 branches off the clutch line 31', in the flow direction behind the pressure control valve 44', and a controllable check valve 57 is positioned in the line 56 and opens in the direction to the pressure control valve to 44. When the pressure control valve 44' is opened, the clutch piston 32' of the coupling 16' is loaded with pressure so that the clutch discs 46' are tightly pressed against one another.

Via the line 56, the hydraulic pressure acts onto the pressure control valve 44. Because of the check valve 57 of the safety device 53, it is ensured that the pressure control valve 44 is not opened completely but only by the amount which is adjusted by the check valve 57.

Figure 5:
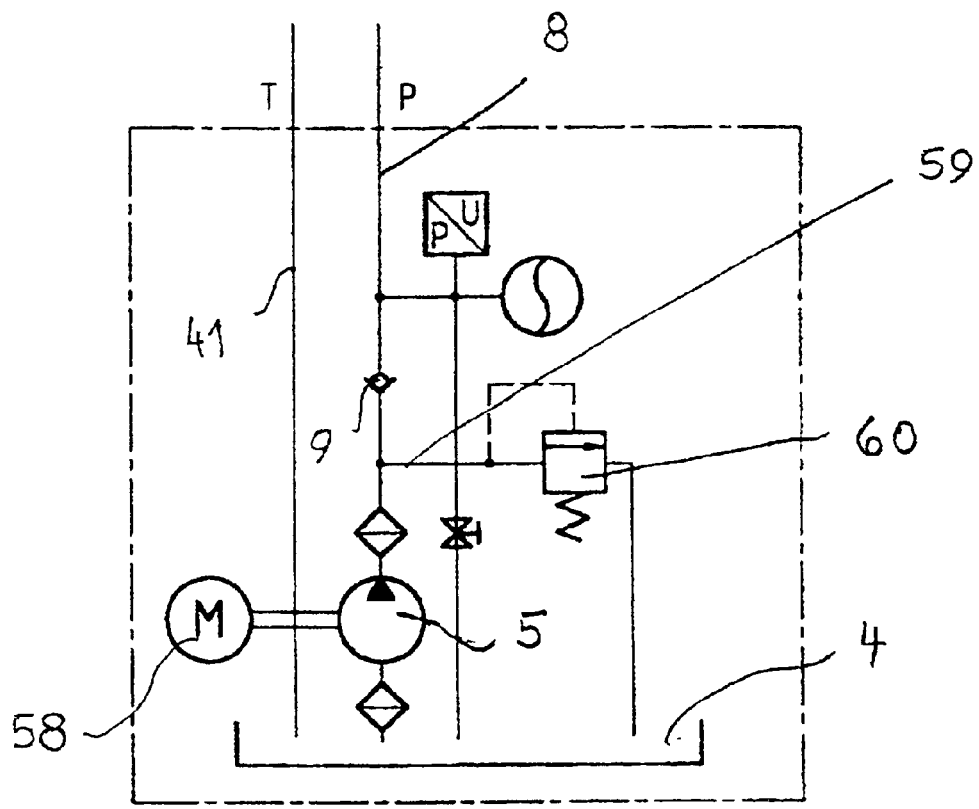
FIG. 5 illustrates a pressure supply of the control device according to the invention.

In the embodiments according to FIGS. 1 through 4, the pressure supply can be configured such that the pump 5 is not driven permanently. In this case, an electric motor 58 (FIG. 5) is provided as a drive for the pump 5. In the area between the pump 5 and the check valve 9 a transverse line 59 branches off the pump line 8. A safety valve 60 is arranged in the line 59. Should the pressure in the pump line 8 surpass a predetermined value, the safety valve 60 opens so that the pump line 8 opens in the direction to the tank 4 and the pressure can be reduced.

Figure 6:
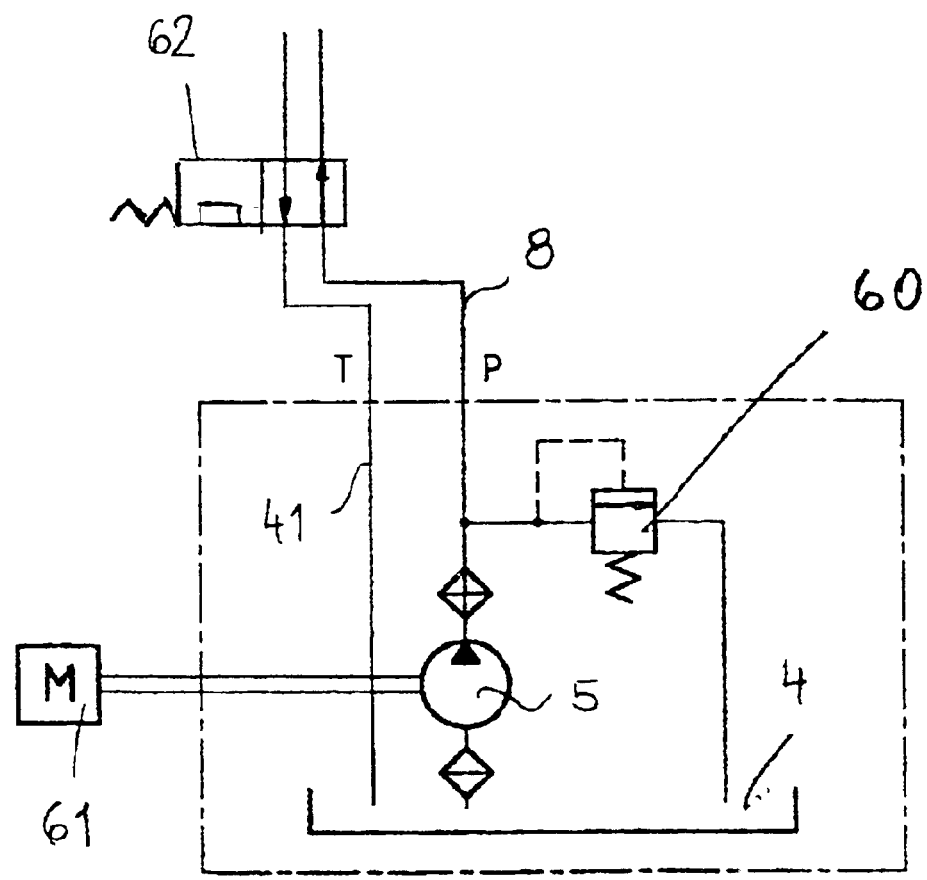
FIG. 6 shows a second embodiment of a pressure supply for the control device according to the invention.
Figure 7:
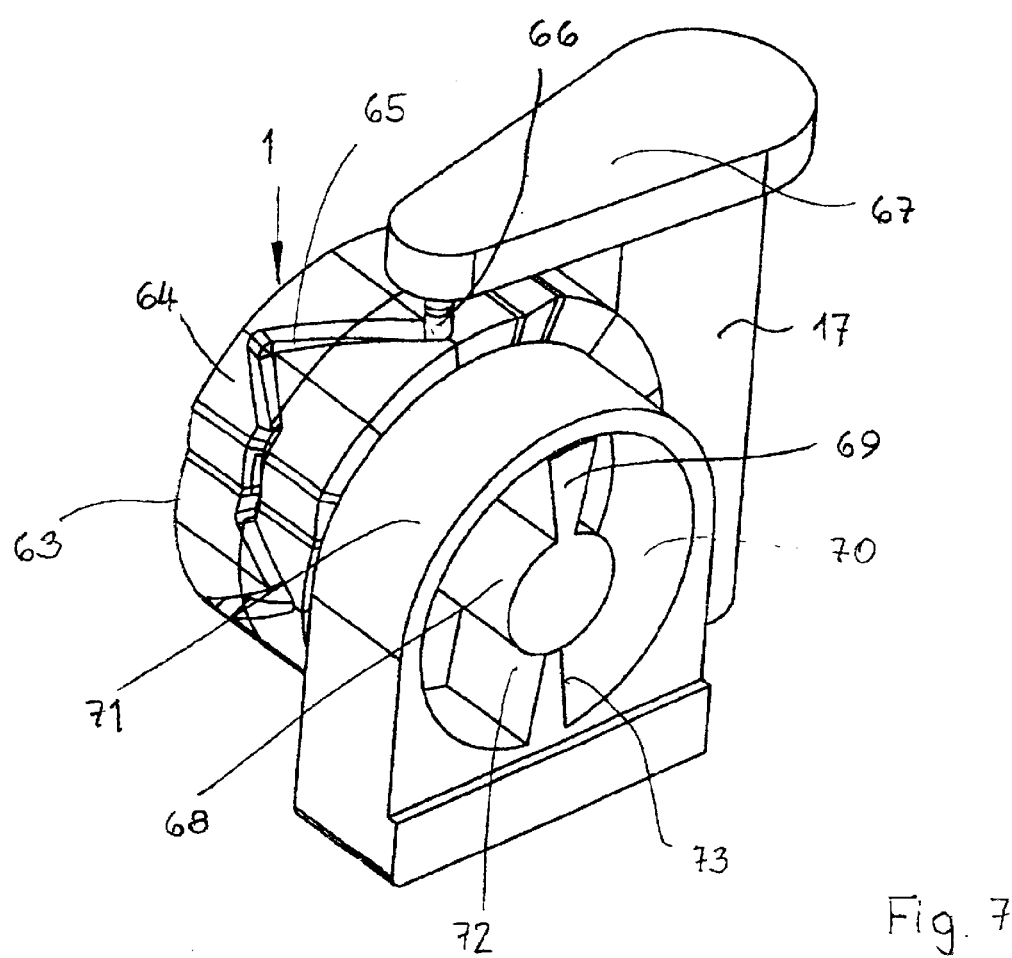
FIG. 7 is a perspective illustration of a shift drum of the control device according to the invention.
Figure 8:
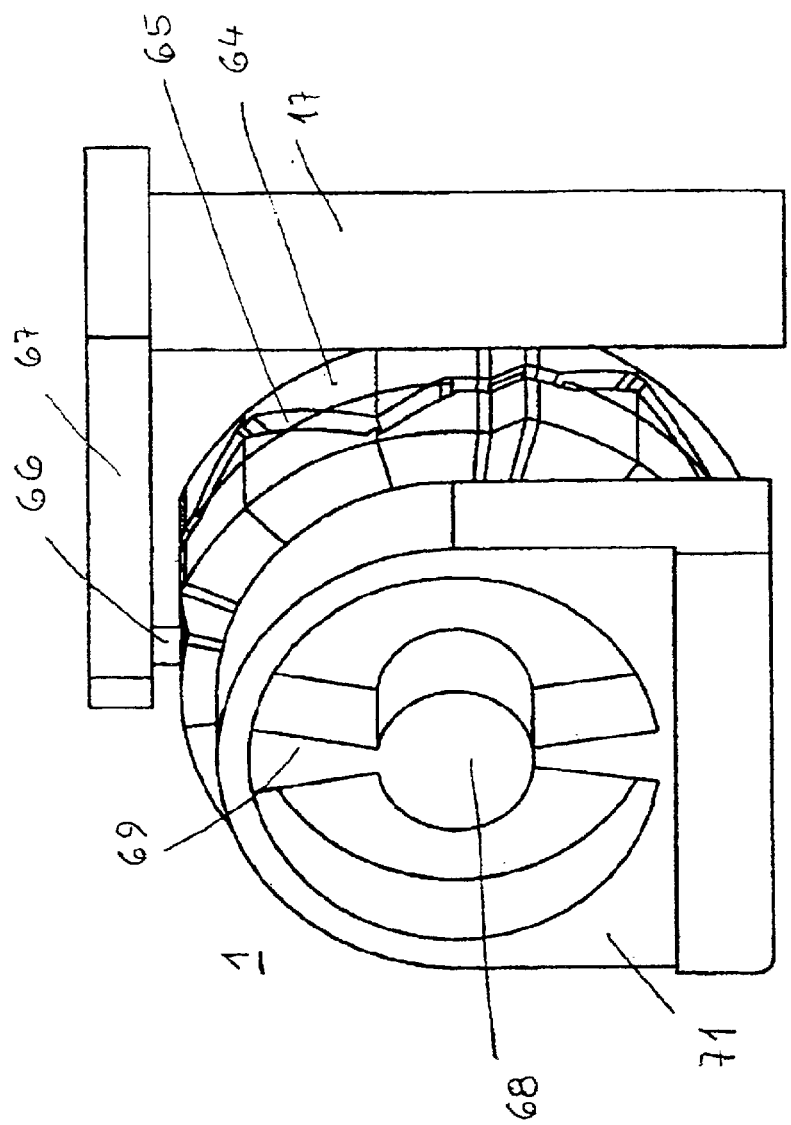
FIG. 8 shows the shift drum according to FIG. 7 in a side view.
Figure 9:
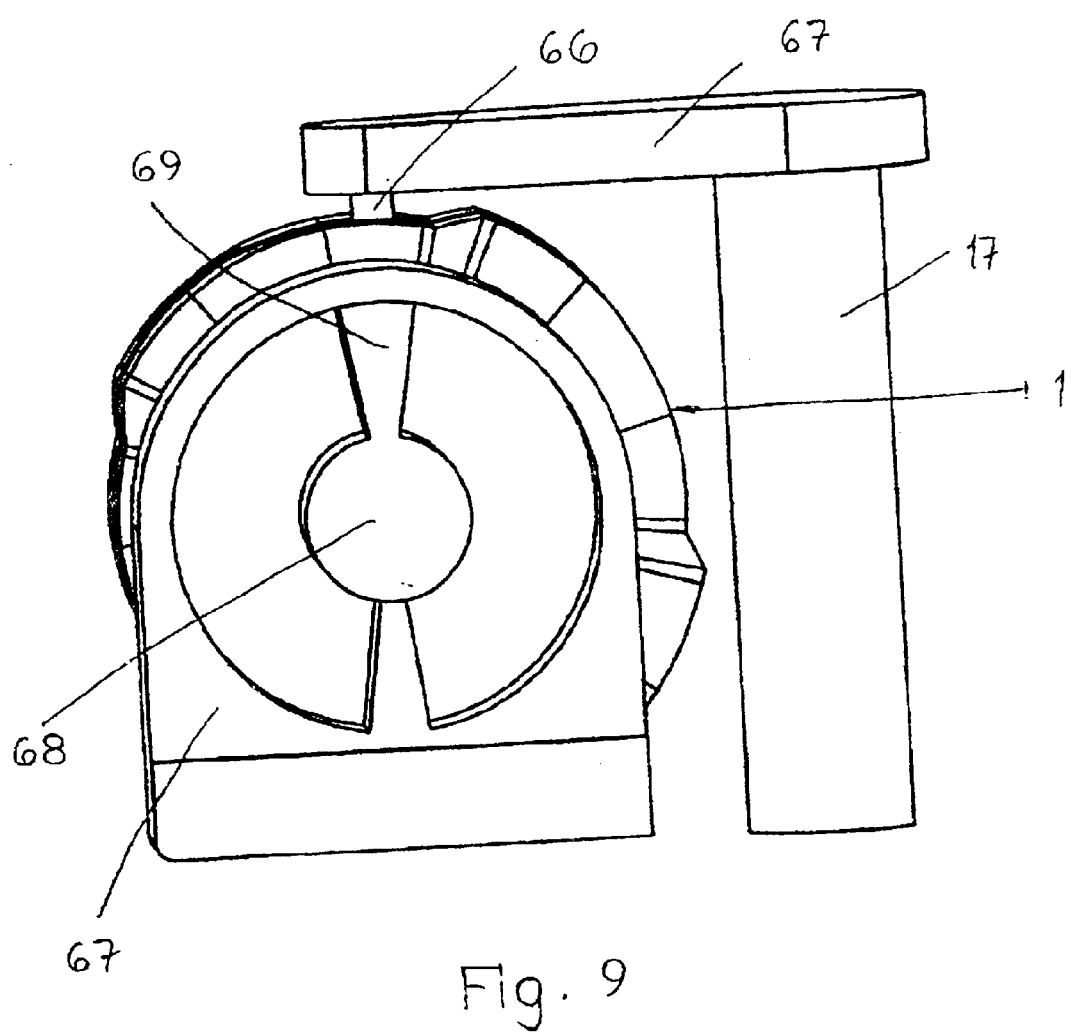
FIG. 9 shows the shift drum according to FIG. 7 in a front view.

FIG. 6 shows an embodiment in which the pump 5 is permanently driven by a motor 61. The motor 61 in this case is the internal combustion engine of the motor vehicle. In order to prevent that in this permanently driven pump 5 hydraulic medium is unnecessarily pumped in circulation, a valve 62 is provided which is switched, when the hydraulic medium is no longer needed for switching of the shift drums 1, 1'. When gearshifting is required, the valve 62 is in the switching position illustrated in FIG. 6. Once gearshifting has been completed and hydraulic medium is no longer required for the shift drums 1, 1', the valve 62 is switched so that the hydraulic medium conveyed by the pump 5 via the pump line 8 returns via the switched valve 62 and the tank line 41 to the tank 4. The valve 62 is connected to a corresponding control unit with which the valve is switched in the required way. The pressure supply according to FIG. 6 is also provided with the safety valve 60 in order to limit the system pressure in accordance with the embodiment of FIG. 5.

FIGS. 7 through 10 show one embodiment of the shift drum 1, 1'. It has a drum body 63 having a control curve 65 provided in the mantle surface 64. A sliding block 66 engages the control curve 65 and projects from an arm 67 which is fixedly attached to the selector shaft 17 of the gearshift mechanism. The axis of the selector shaft 17 is perpendicular to the axis of the shift drum 1.

An axle 68 projects from the end face of the drum body 63 and has a radial wing 69. It forms a rotary piston which is loaded by the hydraulic medium on both sides. The wing 69 is positioned in a pressure chamber 70 of a housing 71. The pressure chamber 70 is divided by the wing or vane 69 into two chambers into which a line for the hydraulic medium opens, respectively. Depending on the position of the valve 2,2', the hydraulic medium reaches one or the other pressure chamber and loads the corresponding lateral surfaces of the vane 69. Accordingly, the shift drum 1 is rotated in the respective direction. The hydraulic medium which is present within the pressure chamber that is not pressure-loaded flows via the tank line 41 (FIG. 1) back to the tank.

The drum body 63 and the control curve 65 are configured such that the selector shaft 17 can be rotated about its axis as well as moved longitudinally in the direction of its axis when the shift drum 1 is rotated.

The pressure chamber 70 is limited in the circumferential direction by two walls 72, 73 against which the wing or vane 69 comes to rest in the end position, respectively.

FIGS. 10 and 11 show a developed view of the mantle surface 64 of the shift drum 1. As illustrated in FIG. 10, the control curve 65 extends in different directions relative to the circumferential direction of the shaft body 63. Accordingly, the selector shaft 17, which engages by means of a sliding block 66 the control curve 65, is rotated correspondingly about its axis. When the sliding block 66 is positioned at the left end of the control curve 65 of FIG. 10, the selector shaft 17 has been rotated about its axis such that the sixth gear of the gearshift mechanism has been shifted. In order to shift from the sixth to the fifth gear, the shift drum 1 is correspondingly rotated. The sliding block 66 reaches accordingly a slanted curve portion 74. This has the result that during rotation of the shift drum 1 the selector shaft 17 is rotated about its axis as a result of the sliding block 66 following the slanted curve section 74. This slanted curve section 74 has a transition into a curve section 75 which is parallel to the circumferential line. When the sliding block 66 is within this curve section 75, the selector shaft 17 is rotated such that the fifth gear has been shifted.

This curve section 75 has a transition into a curve section 76 which is positioned at an opposite slant relative to the curve section 74. The curve section 76 has a transition, via a curve section 77 located at half the axial width of the drum body 63 and extending parallel to the curve section 75, into a further curve section 78 extending in the embodiment parallel to the curve section 76. The curve section 78 adjoins a straight curve section 79 which is parallel to the curve section 75 and is provided near the opposite end face of the shaft body 63. When the sliding block 66 is positioned within the curve section 79, the selector shaft 17 has been rotated such that the fourth gear of the gearshift mechanism has been shifted.

Staring at the curve section 79, the curve sections are repeated so that the sliding block 66 sequentially passes through the different curve sections and the selector shaft 17 is rotated such that the third, second and first gears (3-2-1) and the reverse gear R as well as the parking gear P can be selected. Depending on the slanted position of the curve sections, the selector shaft 17 is rotated into one or the other direction about its axis.

The control curve 65 not only changes direction along the circumference of the drum body 63 but also its height, as is illustrated in FIG. 11. The mantle surface 64 of the drum body 63 has partially cylindrical mantle sections 80 to 83. The mantle section 80 has the smallest outer diameter. In this mantle section 80, the curve sections 74, 75, 76 of the control curve 65 are provided. These curve sections are positioned accordingly on the same radius.

The mantle section 80 has a transition into a mantle section 81 which has a greater outer diameter than the mantle section 80. The following mantle section 82 has again a greater outer diameter than the mantle section 81 but a smaller outer diameter than the subsequent mantle section 83. The curve sections which are positioned within the same one of mantle sections 81 to 83 are positioned on the same radius.

The sliding block 66 is thus not only moved back and forth in the circumferential direction upon rotation of the switching shaft 1 and the selector shaft 17 rotated about its axis in this way, but is also moved transversely to the axis of the shift drum when moving from one of the individual mantle sections 80 to 83 to another. This has the result that the selector shaft 17 is moved correspondingly in its axial direction. This movement of the selector shaft 17 is provided for gutter selection of the gearshift mechanism. When the sliding block 66 is in the area of the mantle section 80, the gutter III of the gearshift mechanism is selected in which the fifth and sixth gear are located. When the sliding block 66 is arranged within the area of the mantle section 81, the gutter II of the gearshift mechanism is selected in which the third and fourth gears are located.

The mantle section 82 corresponds to the gutter I of the gearshift mechanism in which the first and the second gear are located.

When the sliding block 66 finally reaches the mantle section 83, the gutter R is selected in which the reverse gear (R) and the parking gear (P) of the gearshift mechanism are positioned.

The shift drum 1 according to FIGS. 7 to 11 is configured in the described way such that by rotation of the shift drum the selector shaft 17 is linearly moved for gutter selection and rotated for gear shifting within the selected gutter. Since the control curve 65 is configured such that all gears of the gearshift mechanism can be reached, only a single shift drum 1 is required for the gutter and the gear selection. Such a configuration or embodiment is illustrated in FIGS. 1 and 3.

When the gearshift mechanism, on the other hand, has two shift drums 1, 1' according to the embodiment of FIG. 2, the control curves of these two shift drums are such that with the shift drum 1, for example, only the gears can be shifted and with the shift drum 1' only the gutters can be selected. Accordingly, the drum body of the shift drum 1 is cylindrical because the control curve in this case must not be positioned on different diameters of the drum body. On the other hand, the control curve of the gear of the shift drum 1' is selected such that it extends on mantle sections positioned on different diameters of the shaft body. Accordingly, the selector shaft 17 upon rotation of the shift drum 1' is moved in the axial direction. As soon as the gutter has been selected, the actuation of the shift drum 1 in the selected gutter results in the desired gear shifting. Upon rotation of the shift drum 1 the sliding block 66 is moved only back and forth within the control curve so that by means of the arm 67 the selector shaft 17 is rotated by the required amount about its axis.

Depending on the number of gears and gutters, the control curve 65 can, of course, also have a different course in the mantle surface of the drum body 63.

Figure 13:
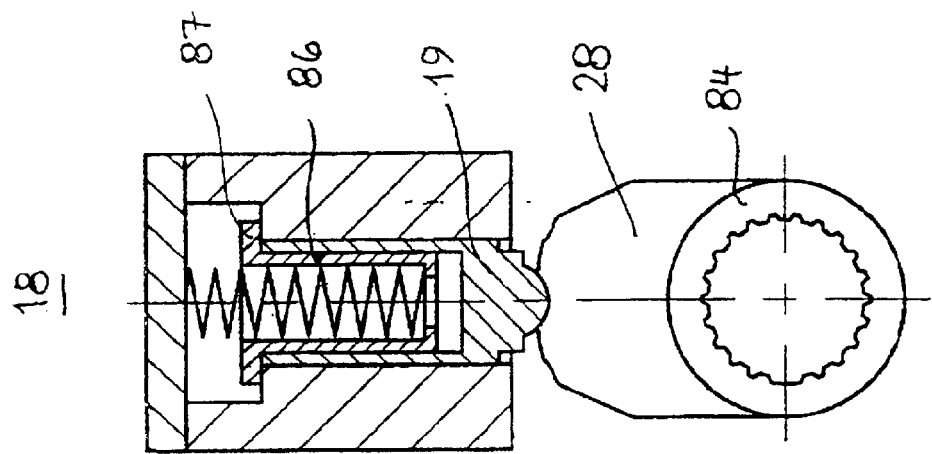
FIG. 13 shows the locking device according to FIG. 12 in a locking position.
Figure 12:
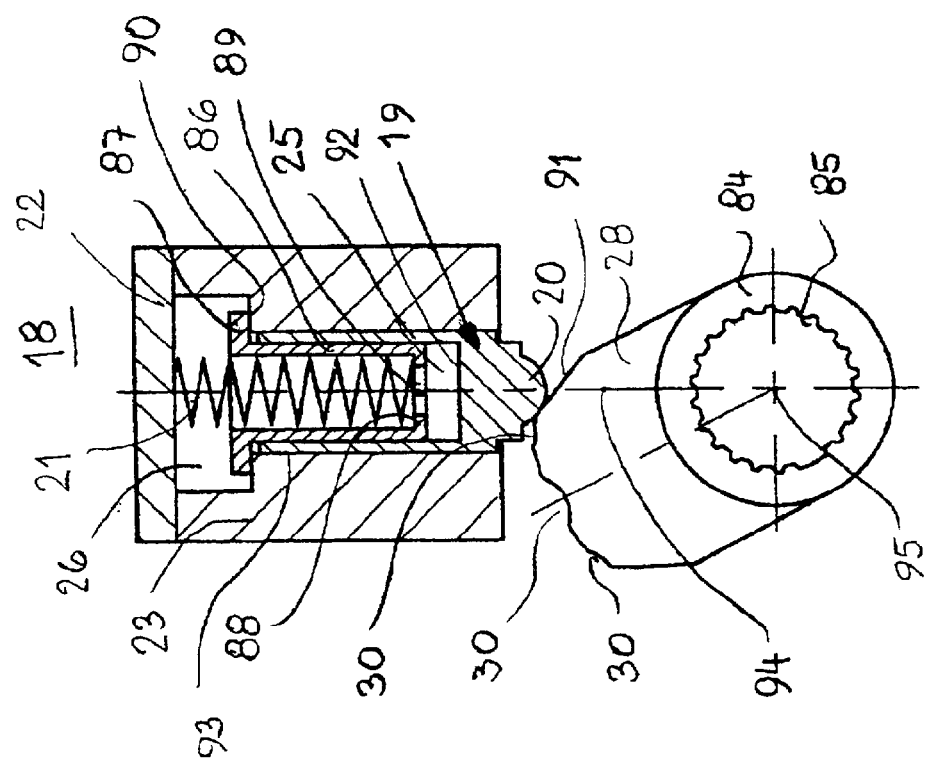
FIG. 12 shows a locking device partially in section and partially in a perspective view.

FIGS. 12 and 13 show one embodiment of the locking device 18 (FIG. 1) with which the respective rotational position of the selector shaft 17 can be secured. The locking counter member 28 projects radially from a ring or a sleeve 84 which is provided with an inner toothing 85. By means of the inner toothing 85, the sleeve 84 engages an outer toothing on the selector shaft 17 in order to achieve a fixed connection with respect to rotation between the sleeve 84 and the selector shaft 17. On the free end of the locking counter member 28 a locking depression 30 is provided centrally in which the locking bolt 19 engages with a head 20 of a spherical cap shape. On both sides of this central locking depression 30 a further locking depression 30 is provided so that the selector shaft 17 can be secured in three rotational positions. Depending on the number of the rotational positions of the selector shaft 17 to be secured, the locking counter member 28 can also have more or fewer locking depressions.

The locking bolt 19 has a central recess 25 into which a cup-shaped sleeve 86 projects which rests slidingly on the inner wall of the recess 25 and has a radially outwardly oriented flange 87 on its end facing away from the free end 20 of the locking bolt 19. The flange 87 serves as a stop for the sleeve 86 which is loaded by the force of the pressure spring 21. The spring 21 projects into the sleeve 86 and is supported with one end on the bottom 88 of the sleeve 86 located within the locking bolt 19 and with its other end on the bottom 22 of the housing 23. The bottom 88 of the sleeve 86 has a central opening 89.

The bottom 22 of the housing 23 closes off the pressure chamber 26 in which the pressure line 27 of FIG. 1 (not illustrated in this embodiment) opens via which the pressurized hydraulic medium is supplied. The sleeve 86, loaded by the force of the pressure spring 21 and, upon pressure loading with the hydraulic medium, loaded by the hydraulic pressure, is supported with its flange 87 on a wall 90 of the pressure chamber 26 opposite the bottom 22.

FIG. 12 shows a position of the selector shaft 17 and thus also of the locking counter member 28 in which the locking bolt 19 with its free end 20 rests in the area adjacent to the locking depression 30 on a slanted surface 91 of the free edge of the locking counter member 28. Loaded by the pressure of the hydraulic medium, the locking bolt 19 rests against this slanted surface 91. The hydraulic medium reaching the pressure chamber 26 flows through the sleeve 86 and its opening 89 to an end wall 92 of the locking bolt 19 delimiting the recess 25 so that it is pressed outwardly against the locking counter member 28. The locking bolt 19 resting on the wall of the opening 93 of the housing 23 has in this position a minimum spacing from the flange 87 of the sleeve 86. As soon as the locking bolt 19 with its free end 20 reaches the locking depression 30, it is moved back so far that the locking bolt 19 rests on the flange 87 of the sleeve 86 (FIG. 13). The locking bolt 19 and the selector shaft 17 are correlated with one another such that the axis 94 of the locking bolt 19 extends through the axis 95 of the sleeve 84, and thus of the selector shaft 17, wherein the axis 95 is positioned perpendicularly to the locking bolt 19. Moreover, the locking depressions 30 are positioned on the same radius of curvature about the axis 95 so that the locking bolt 19 in any locking position rests on the flange 87 of the sleeve 86.

By means of the locking device 18 it is ensured that the selector shaft 17 reaches its precise position for gear shifting or gutter selection. As a result of the pressure loading by means of the pressure spring 21 and the hydraulic pressure, the selector shaft 17 is rotated by means of the locking counter member 28 in any case into the locking position, as illustrated in an exemplary fashion in FIG. 13. In this way, gearshift mechanism (gearbox) tolerances are easily compensated.

Since the selector shaft 17, depending on the configuration of the gearshift mechanism, is axially moved either for gutter selection or gear shifting, the locking counter member 28 is of such a length in the axial direction of the selector shaft 17 that locking engagement is possible in any moved position of the selector shaft 17.

In the embodiment according to FIG. 4, the gearshift mechanism is provided with two clutches 16, 16', wherein the clutch 16 is correlated with the first, third, and fifth gear as well as reverse gear (schematically indicated in the drawings by 1-3-5-R) and the clutch 16' with the second, fourth and sixth gear (schematically indicate in the drawings by 2-4-6). FIGS. 14 to 16 show a further embodiment of such a twin clutch 16*a*. It has an axle 96 on which a spindle 97 is fastened for a fixed connection in regard to rotation. It is actuated by a worm gear mechanism 98. Depending on the rotational direction of the worm gear mechanism 98 the axle 96 is moved to the right or the left by means of the spindle 97. On the axle 96 two clutch discs 99,100 are fastened having correlated therewith clutch discs 101, 102 of the gearshift mechanism. The two clutch discs 101, 102 on the side of the gearshift mechanism are loaded by the force of disc springs 103,104 which load the clutch discs 101,102 in the direction toward the clutch discs 99,100. The disc springs 103, 104 are seated on the axle 96 and are supported on walls 105, 106 of the gearshift mechanism, wherein the axle 96 projects though these walls 105, 106.

The two clutch discs 99, 100 have sleeve-shaped projections 107, 108 oriented toward one another and provided with an outer thread that engages the spindle 97.

Figure 17:
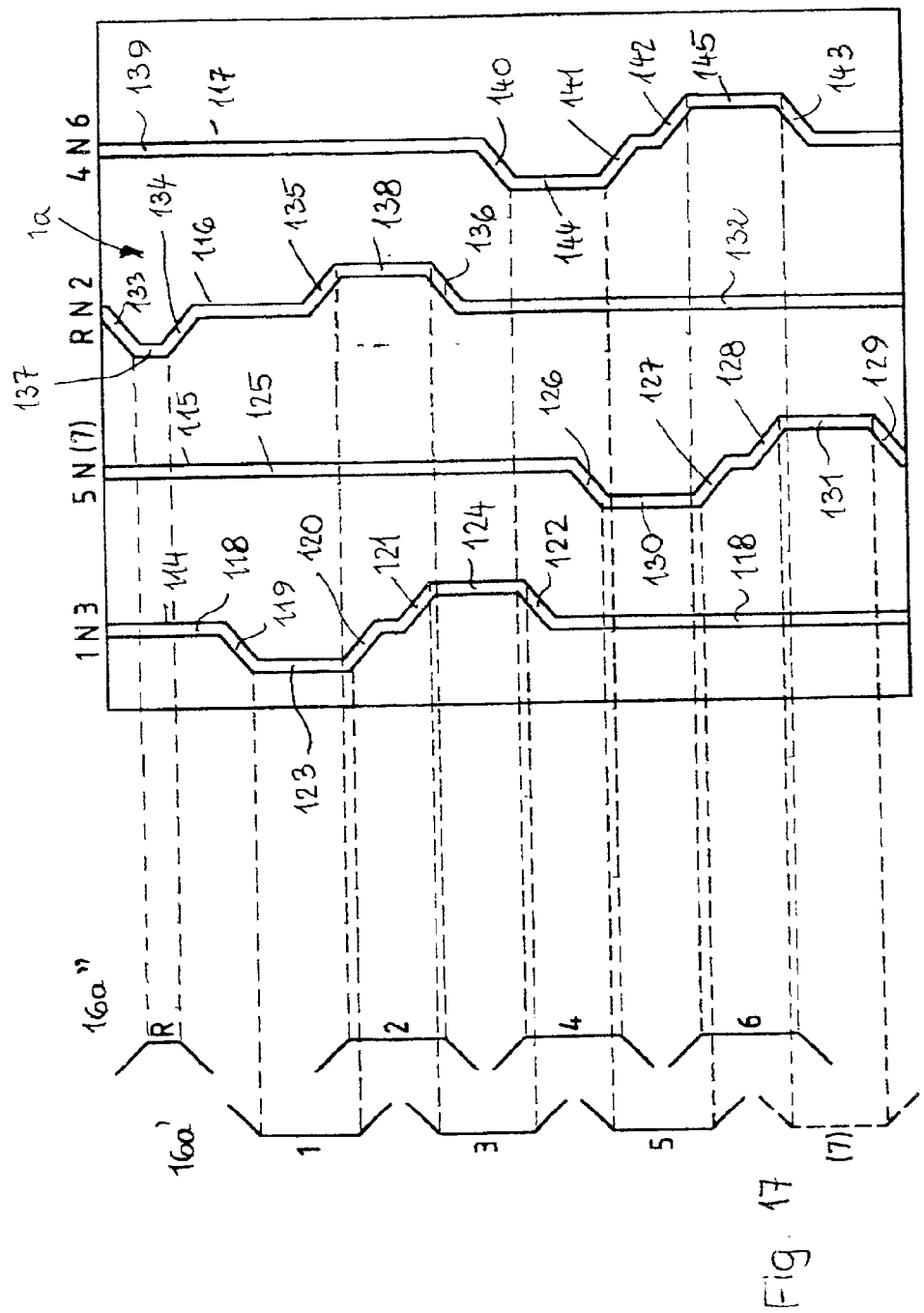
FIG. 17 shows a developed view of the shift drum of the control device according to the invention with corresponding switching schematic.

FIG. 14 shows the initial position of the clutch 16a during idle of the motor vehicle. In this case, the two clutch discs 100,102 are engaged while the clutch discs 99,101 are disengaged. The clutch 16a' accordingly generates no torque while the other clutch 16a" produces 100% of the torque. The clutch 16a', as illustrated in FIG. 17, has correlated therewith first, third, and fifth gears (1-3-5) and optionally a seventh gear and the clutch 16a" has correlated therewith the second, fourth, and sixth gears and reverse (2-4-6-R). In the position illustrated in FIG. 14, for example, the first gear is shifted so that the clutch discs 99, 101 of the clutch 16a' are disengaged.

When the vehicle is to drive off, by means of the worm gear mechanism 98 the clutch 16a' is closed. Accordingly, the worm gear 98 is driven such that the axle 96 is moved to the left. Accordingly, the clutch discs 99, 100 fixedly connected thereto are axially moved to the left. FIG. 15 shows a middle position during movement of the axle 96. In this middle position the clutch discs 99, 101 and 100, 102 rest against one another. The prestress of the pressure springs 103, 104 is selected such that the torque is distributed uniformly onto both clutch discs 16a', 16a". Both clutches thus transmit 50% of the torque. At the end of the shifting process (FIG. 16) the two clutch discs 100, 102 of the clutch 16a" are disengaged while the clutch discs 99, 101 are engaged. In this position, the first gear of the gearshift mechanism is thus shifted. Now the clutch 16a' of the twin clutch 16a transmits the full torque while the clutch 16a" cannot transmit torque.

Figure 23:
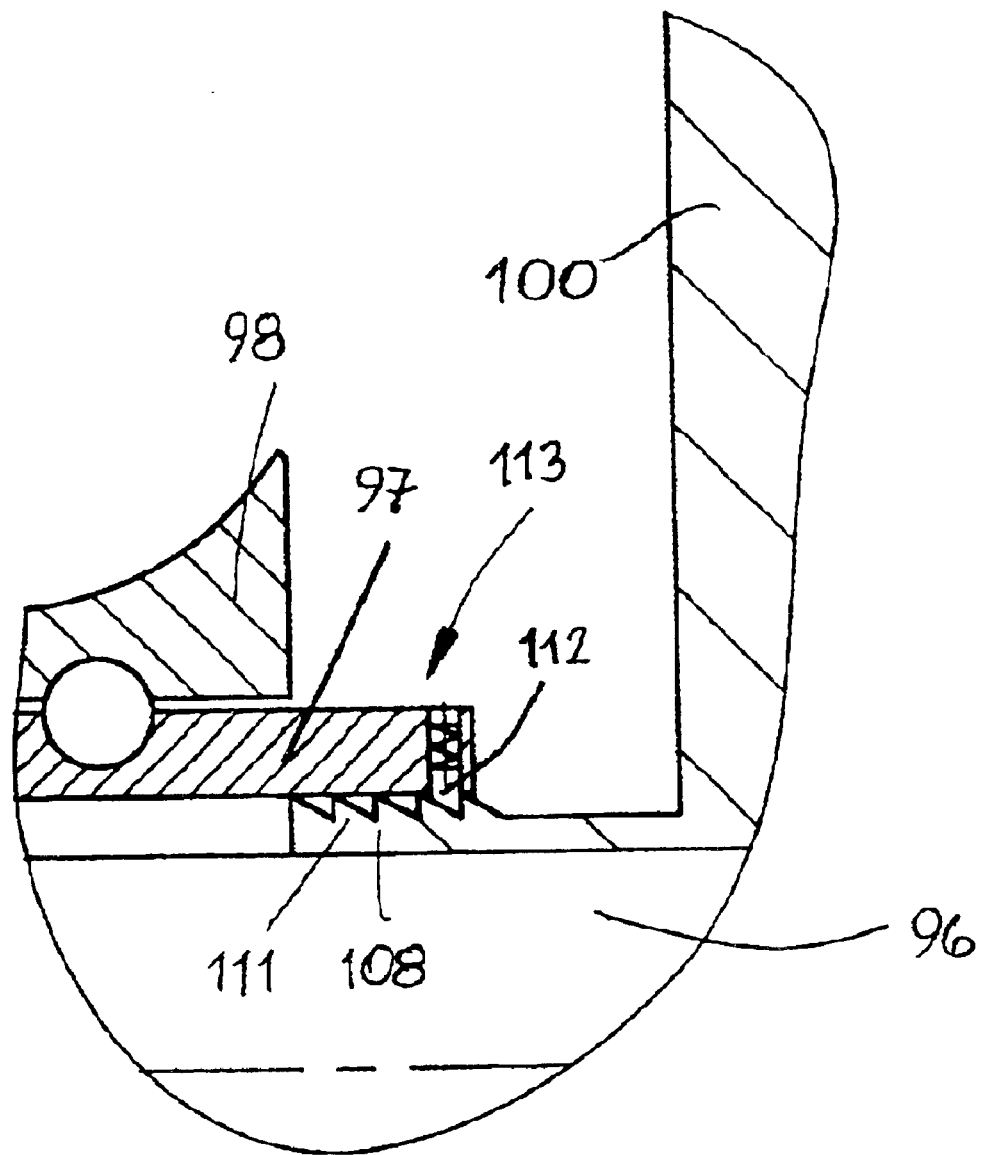
FIG. 23 shows an enlarged section illustration of an adjusting device for a clutch.

For the two coupling discs 99, 100 stops 109, 110 are provided on the gearshift mechanism. They are advantageously adjustable as a function of the wear of the clutch discs 99, 102. As illustrated in FIG. 23, in the hub-shaped projection 108 of the clutch disc 100 a sawtooth-shaped profiling 111 is provided which is engaged by a locking bolt 112 loaded by a spring force. The locking bolt 112 is arranged in the end of the spindle 97 projecting past the worm gear mechanism 98. The profiling 111 and the locking bolt 112 are configured such that the clutch disc 100 cannot be moved in the direction of the oppositely positioned clutch disc 99, not illustrated in FIG. 23, but only in the opposite direction.

The adjusting device 113 described in connection with FIG. 23 for the clutch disc 100 is provided in the same way also for the oppositely positioned clutch disc 99.

When the clutch discs 99 to 102 have a correspondingly great wear, a correspondingly greater adjusting stroke is required for the coupling discs 99, 100 in order for them to be able to engage the clutch discs 101, 102. This greater adjusting stroke has the result that the locking bolt 112 engages from the position according to FIG. 23 into the neighboring sawtooth of the profiling 111 to the left. With this adjusting movement the adjusting stroke of the respective clutch discs 99, 100 remains approximately constant even for increasing wear.

The adjusting device for the clutch discs, of course, can also be of any other suitable configuration, for example, locking devices in the form of discs with sawtooth profiling at the flat sides, as is known in the art.

As illustrated in the switching schematic according to FIG. 17, when the first gear is selected by means of the clutch 16a', by means of the clutch 16a" the second gear can be already preselected. Once the second gear is shifted, the third gear can be shifted in the same way by means of the clutch 16a'. In this way, the individual gears of the gearshift mechanism can be shifted sequentially, wherein always one of the two clutches 16a', 16a" is closed.

In order to realize this switching process, the corresponding shift drum 1a, whose developed view is illustrated in FIG. 17, has four control curves 114 to 117. A sliding block of the selector shaft 17 engages the control curves, respectively, in the same way as illustrated in the embodiment according to FIGS. 7 to 10 for the shift drum 1, 1' with only one control curve 65. The control curves 114 to 117 are adjusted to one another such that, as soon as one gear has been shifted, the next gear of the gearshift mechanism has been preselected already by means of the other clutch 16a' or 16a". As soon as this preselection has been carried out, the worm gear mechanism 98 is rotated such that the axle 96 is moved into the desired direction.

As illustrated in FIG. 17, the control curve 114 has correlated therewith the first and third gears (1 and 3), the control curve 115 the fifth and seventh gears (5 and 7), the control curve 116 the reverse gear (R) and the second gear (2), and the control curve 117 the fourth and sixth gears (4 and 6). Each control curve has curve sections extending in the circumferential direction of the shift drum 1a which correspond to the neutral position N of the gearshift mechanism. The control curve 114 has a curve section 118, extending in the circumferential direction and correlated with the neutral position N, wherein slanted curve sections 119, 120 and 121, 122 adjoin the curve section 118. Via the slanted curve sections 119, 120, the sliding block engaging the control curve 114 reaches the curve section 123 extending parallel to the curve section 118. The sliding block engages this curve section 123 when the first gear is to be shifted. Accordingly, the two curve sections 121, 122 extending on the other side of the circumferentially extending curve section 118 connect to a curve section 124 extending parallel to the curve section 118. This curve section 124 is correlated with the third gear of the gearshift mechanism.

Slanted curve sections 126, 127 and 128, 129 extend away from the straight curve section 125 of the control curve 115 and adjoin curve sections 130, 131, respectively, which extending parallel to the curve section 125. These two curve sections 130, 131 are positioned on opposite sides of the curve section 125 correlated with the neutral position N. The curve section 130 corresponds to the fifth gear and the curve section 131 to the seventh gear of the gearshift mechanism.

The control curve 116 has a curve section 132 extending in the circumferential direction and correlated with the neutral position N. The slanted curve sections 133, 134, and 135, 136 extend away from the curve section 132. The curve sections 133, 134; 135, 136 connect to curve sections 137 and 138 extending parallel to the curve section 132 and positioned on opposite sides of the curve sections 132. The curve section 137 is correlated with the reverse gear and the curve section 138 with the second gear of the gearshift mechanism.

The control curve 117, finally, has a curve section 139 extending in the circumferential direction and correlated with the neutral position N. The slantedly extending curve sections 140, 141 and 142, 143 extend away from the curve section 139. They connect to curve sections 144, 145 extending parallel to the curve section 139 on opposite sides of the curve section 139. When the sliding block is in the curve section 144, the fourth gear is shifted; the sixth gear is shifted when the sliding block is within the curve section 145.

The control curves 114, 115 by which the first, third, fifth, seventh gears (1-3-5-7) can be shifted, are correlated with the clutch 16a' while the control curves 116, 117 for the reverse gear R and the second, fourth, sixth gears (2-4-6) are correlated with the clutch 16a". This division of the gears onto the two clutches enables preselecting the next gear in the way described above while the vehicle is still driven in the lower or higher gear, respectively.

The shift drum 1a can be configured such that after shifting of the highest gear, the shift drum must be rotated back in order to reach the lower gears. However, it is also possible to configure the shift drum 1a such that in this case it is rotated in the same rotational direction in order to reach the lower gears from the highest gear. The corresponding control is configured accordingly.

Since for the two clutches 16a', 16a", only a single shift drum 1a is provided, the control device has a very simple configuration. However, the gears of the gearshift mechanism must be shifted in sequence, i.e., starting from the first gear all intermediately positioned gears must be shifted in order to reach, for example, the fifth gear. When, however, two selector shafts are used (FIGS. 2 and 4), it is possible to selectively shift, for example, from the first gear directly into the third or fourth gear.

The straight (parallel to the circumferential direction) curve sections 123, 124; 130, 131; 137, 138; 144, 145 correlated with the gears of the gearshift mechanism have such a length in the circumferential direction of the shift drum 1a that the curve sections of sequentially arranged gears overlap one another (FIG. 17). In this way, the described preselection of the next gear is possible.

Figure 18:
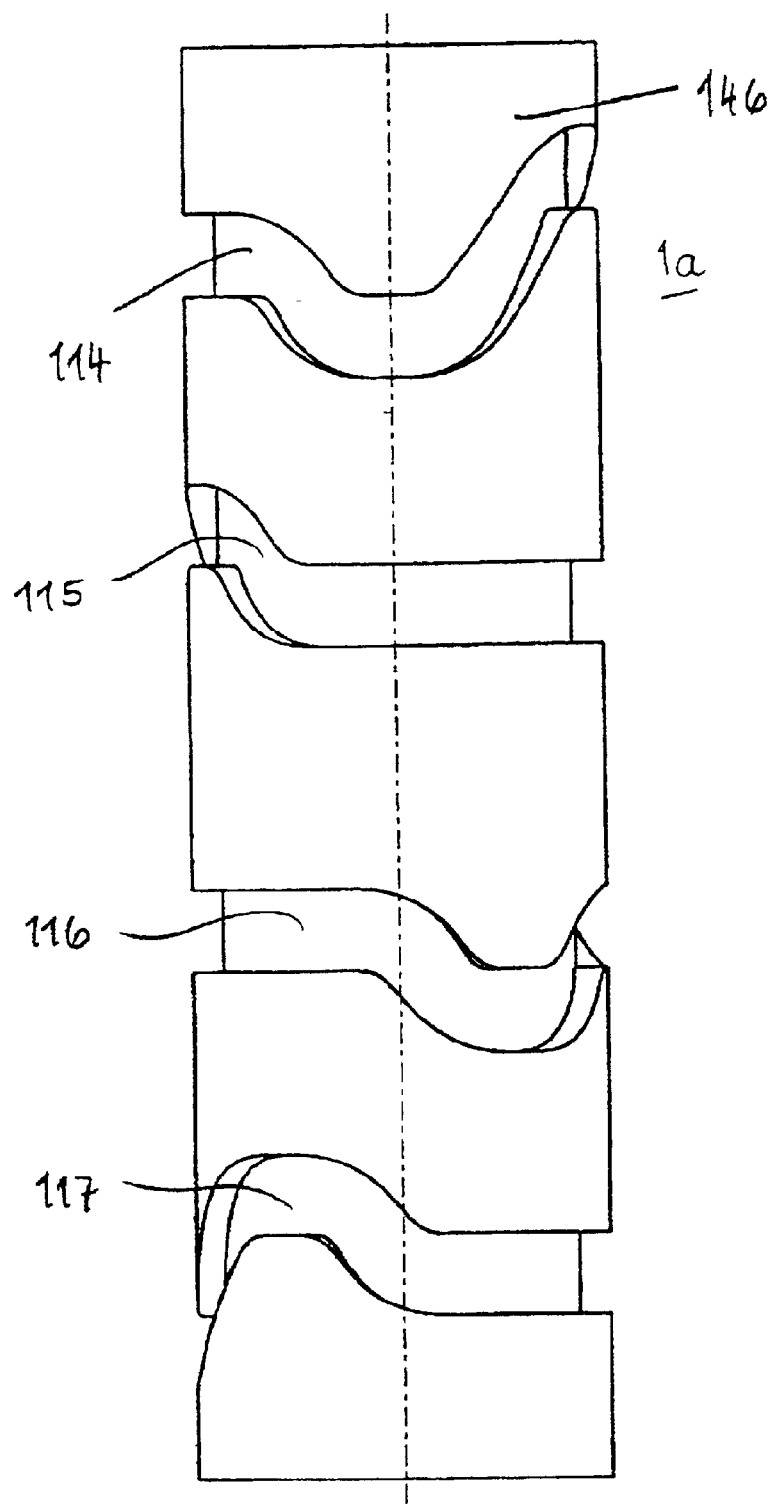
FIG. 18 shows the shift drum correlated with the switching schematic of FIG. 17.

FIG. 18 shows the shift drum with a cylindrical drum body 146 in which the control curves 114 to 117 are provided as recesses at an axial spacing to one another.

Figure 20:
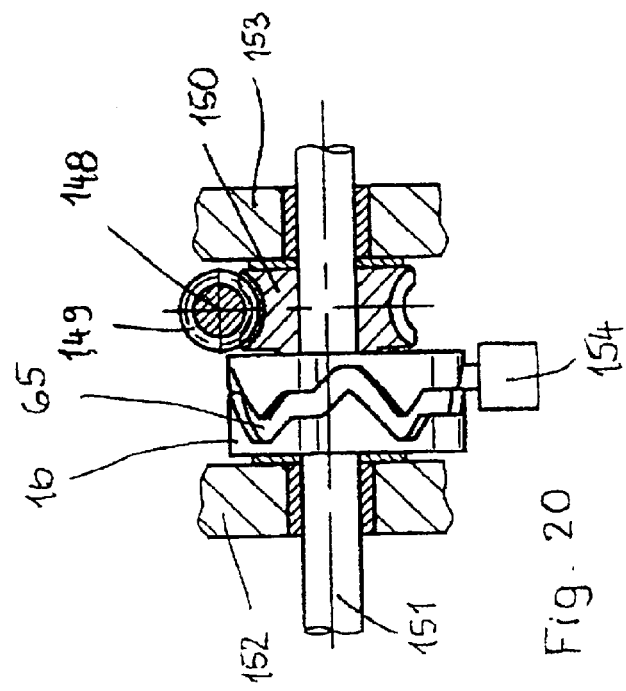
FIG. 20 shows the drive according to FIG. 19 in a side view.
Figure 19:
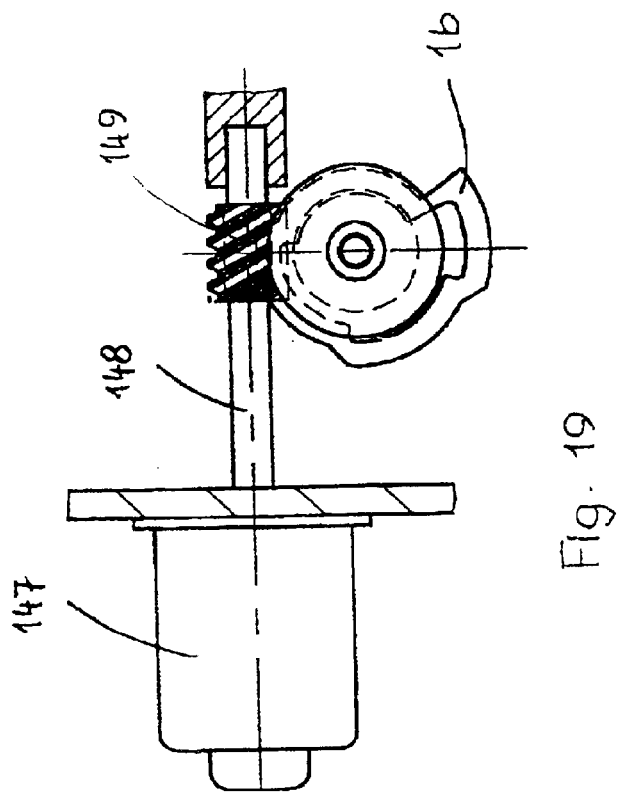
FIG. 19 shows a front view of the drive for the shift drum.

FIGS. 19 and 20 show an embodiment of rotating mechanically the shift drum. For this purpose, an electric motor 147 is provided having on its motor shaft 148 a worm gear 149 fixedly connected thereto which engages a worm gear 150 which is rotationally fixedly seated on a shaft 151. The shift drum 1b is also fastened on the shaft 151 for common rotation. In the illustrated embodiment the shift drum 1b is configured according to the embodiment of FIGS. 7 through 10 and has a single control curve 65. The shaft 151 is rotatably supported in bearings 152, 153.

A shifting finger 154 engages the control curve 65 of the shift drum 1b with which the selector shaft (not illustrated) can be rotated and axially moved, as explained in detail with the aid of FIGS. 7 to 10. With the worm gear mechanism 149, 150, the shift drum 1b can be rotated in the desired direction by the desired amount. For this purpose, the shifting finger 154 engaging the control curve 65 is accordingly pivoted and moved, as has been explained by means of the sliding block 66 and the arm 67 of the embodiment according to FIGS. 7 through 10. Accordingly, the selector shaft for the gutter selection and gear shifting is rotated about its axis and moved in the axial direction.

FIGS. 21 and 22 show a clutch which can be mechanically actuated by a worm gear mechanism. The clutch is configured in the illustrated embodiment such that pressure loading opens the clutch. The mechanical drive can however also be used in clutches which are closed when pressure is applied. The clutch 16c is arranged within the gear housing 155 and has a crankshaft 156 aligned with the transmission shaft 157. The crankshaft 156 is fixedly connected with a flywheel 158 which together with the housing part 159 surrounds a driving disc 160. It is fixedly connected to the transmission shaft 157 for common rotation but is movable axially to a limited extent relative to the transmission shaft 157.

The transmission shaft 157 is provided with a thrust bearing 161 which can act on the pressure plate 162 which, in turn, can interact by means of clutch pads with the driving disc 160. The pressure plate 162 is loaded by a disc spring 164 in the direction toward the driving disc 160.

The gearbox housing 155 has a receiving chamber 156 for at least one bearing 166 in which the transmission shaft 157 is rotatably supported. A clutch release spindle 167 is mounted thereon and can be actuated by the worm gear mechanism 168. It comprises a worm 169 seated on the motor shaft 170 which extends perpendicularly to the transmission shaft 157. The worm 169 meshes with a worm gear 171 with which the transmission shaft 157 can be moved axially by means of the clutch release spindle 167 in the direction toward the crankshaft 157. By means of the thrust bearing 161 the clutch pads 163 are firmly pressed against one another and in this way the clutch 16c is actuated.

The motor shaft 170 with its free end is rotatably supported in a bearing 172 of the gearbox housing 155. The electric motor 173 is provided on the outer side of the gearbox housing 155 (FIG. 21).

Figure 24:
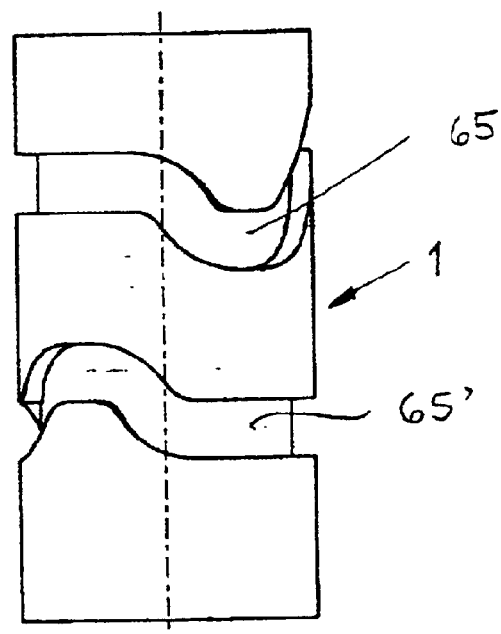
FIG. 24 shows a first shift drum for use in the control device according to FIG. 4.
Figure 25:
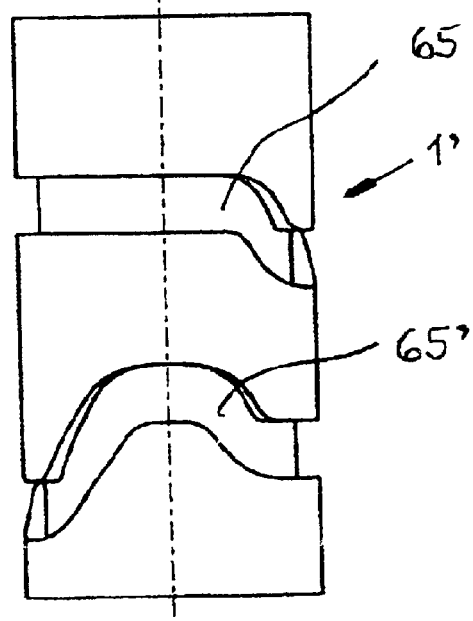
FIG. 25 shows a second shift drum for use in the control device according to FIG. 4.

FIGS. 24 and 25 show the two shift drums 1, 1' of the embodiment according to FIG. 4. The two shift drums are basically of the same configuration as the shift drum 1 according to FIGS. 10 and 11. The shift drum 1 is correlated with the gears (1-3-5 and R) and the shift drum 1' is correlated with the gears (2-4-6) of the gearshift mechanism. Accordingly, each shift drum has only two control curves 65, 65' which are basically of the same configuration as the control curve 65 of the shift drum 1 according to FIGS. 10 and 11. The control curves 65, 65' have accordingly also curve sections positioned at a slant to the circumferential direction, as has been explained in detail in connection with FIGS. 10 and 11. Moreover, the individual curve sections are positioned at different radial spacing to the axis 174, 174' of the shift drums 1, 1', as has been explained in detail with the aid of FIG. 11 for the shift drum 1 according to the embodiment of FIG. 1. The sliding block which engages the control curves 65, 65' has the same width as the control curves 65, 65', as in the preceding embodiments, so that it is guided properly upon rotation of the shift drums 1, 1' and the selector shaft 17 can be rotated and shifted properly by means of the arm 67 (FIGS. 7 through 9) in order to select the gutters of the gearshift mechanism or to shift the gears.

FIGS. 26 to 29 show in an exemplary fashion one embodiment of the control device as it can be used in connection with the embodiment of FIG. 4. It has two shift drums 1, 1' of which the shift drum 1 is provided for the gears (1-3-5-R) and the shift drum 1' for the gears (2-4-6) of the gearshift mechanism. Both shift drums 1, 1' are connected to a common axle 175 which is fixedly supported with its two ends so as not to rotate. The shift drums 1,1' are seated rotatably on the common axle 175 and are provided with the groove-shaped control curves 65, 65' which are engaged by the sliding blocks 66 (FIG. 7 through 9) of the arms 67 which are connected fixedly in regard to rotation and axial movement on the selector shaft 17. The arms 67 form the selector forks of the gearshift mechanism. By rotating the shift drums 1, 1', the selector shaft 17 is rotated about its axle as well as axially moved by the required amount.

The two shift drums at their end faces facing away from one another are provided with position recognition means 176, 177 for reliably measuring the rotational position of the shift drums 1, 1'. This ensures that the respective gears of the gearshift mechanism can be reliably shifted.

Figure 27:
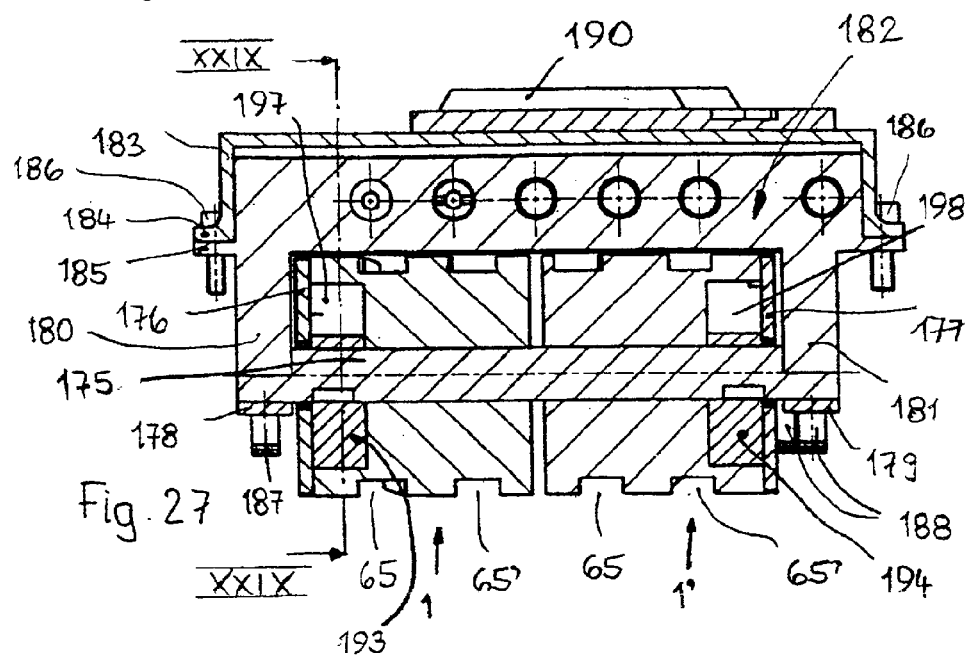
FIG. 27 shows a longitudinal section of the control unit according to FIG. 26.
Figure 28:
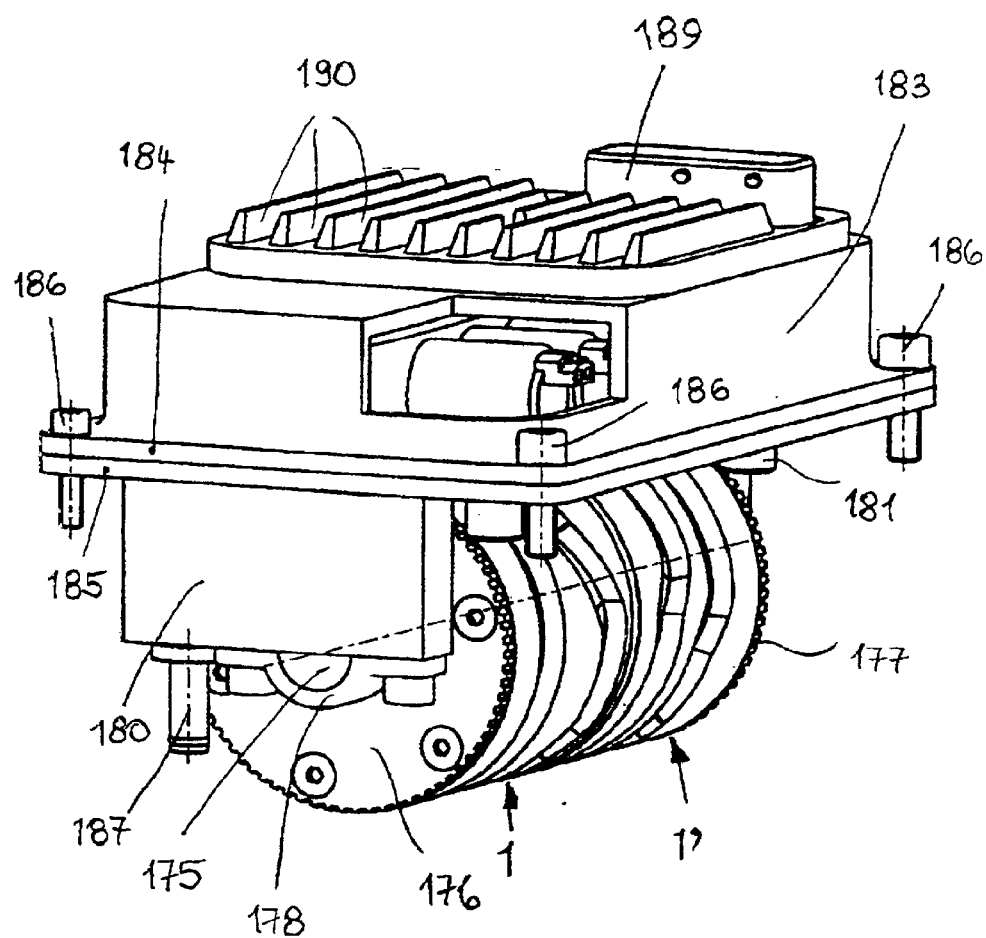
FIG. 28 shows the control unit according to FIG. 26 in a perspective illustration.

The axle 175, as can be seen in FIGS. 27 and 28, is received with its ends in bearing eyes 178, 179 which are provided at a lower end of a downwardly extending housing part 180, 181 of a housing 182, respectively. The housing 182 is arranged in a tub-shaped, preferably spray watertight, housing 183 which has a peripheral outwardly projecting rim 184 which rests on a peripheral outwardly projecting rim 185 of the housing 182. The two rims 184, 185 have advantageously the same width and advantageously the same contour. The two housings 182, 183 are connected to one another by screws 186 which are distributed about the circumference of the rims 184,185.

In the housing 182 the valves as well as the control unit of the control device are arranged. Moreover, the oil distribution device is also arranged within the housing 182.

From the two narrow housing parts 180,181 plug-in contacts 187,188 extend downwardly for receiving the control and supply lines. On the housing 183 a plug 189 is provided. In the area adjacent thereto cooling ribs 190 project from the top side of the housing 183 which extend advantageously parallel to one another and perpendicularly to the plug 189.

The control device is inserted into a mounting opening 191 of the gearbox housing 192. The rim 185 of the housing 182 rests within the circumferential sealing surface provided relative to the gearbox housing 192. The control device is fastened by screws 186 to the gearbox housing 192.

Figure 29:
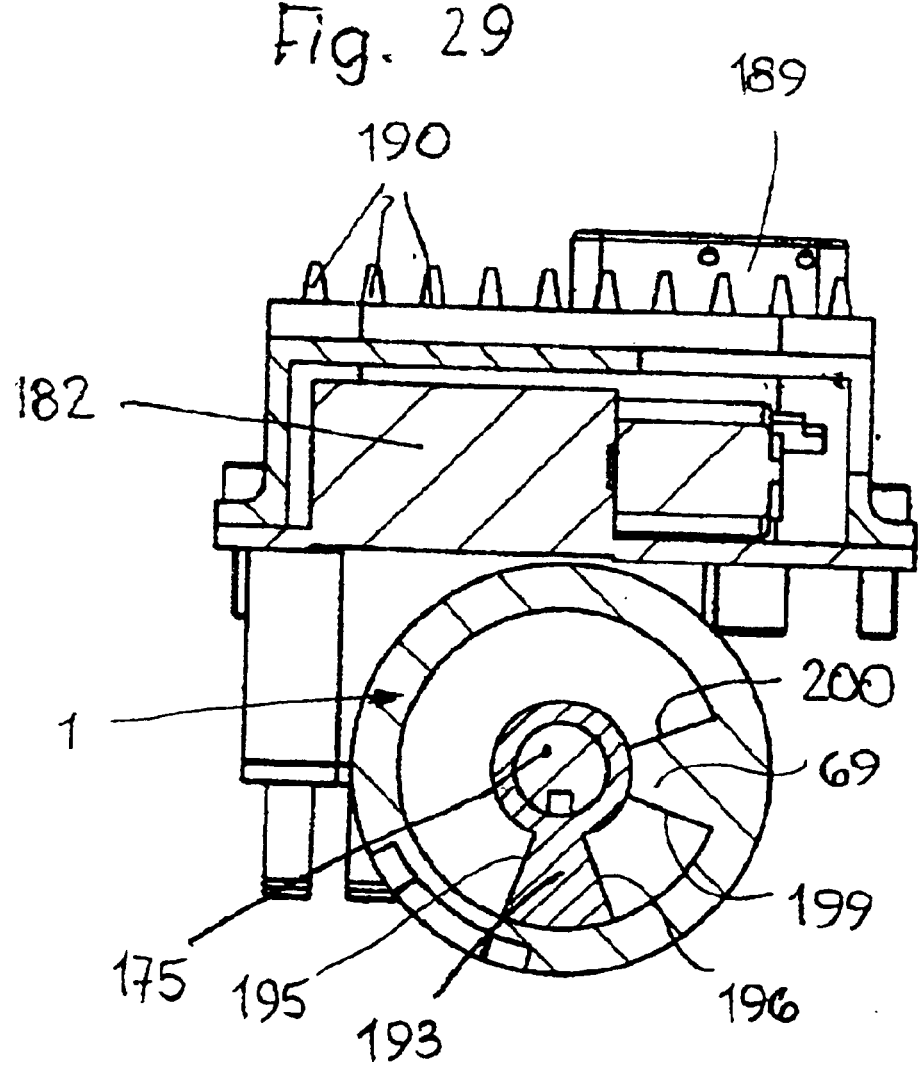
FIG. 29 shows a section along the line XXIX—XXIX in FIG. 27.

On the axle 175, adjacent to the position recognition discs 176, 177, a finger 193, 194 is provided, respectively, which projects radially from the axle 175 (FIG. 27 and 29) and is axially fixedly connected thereto. The fingers 193, 194 have, as is illustrated in FIG. 29 for the finger 193, radially positioned lateral surfaces 195, 196 which serve as stop surfaces for the vane 69 which projects radially from the inner side of end face recesses 197, 198 of the shift drum 1, 1' (FIGS. 27 and 29). In the end positions, the shift drum 1, 1' contacts with the radially positioned sidewalls 199, 200 of the wing or vane 69 the sidewalls 195, 196 of the finger 193, 194.

Figure 26:
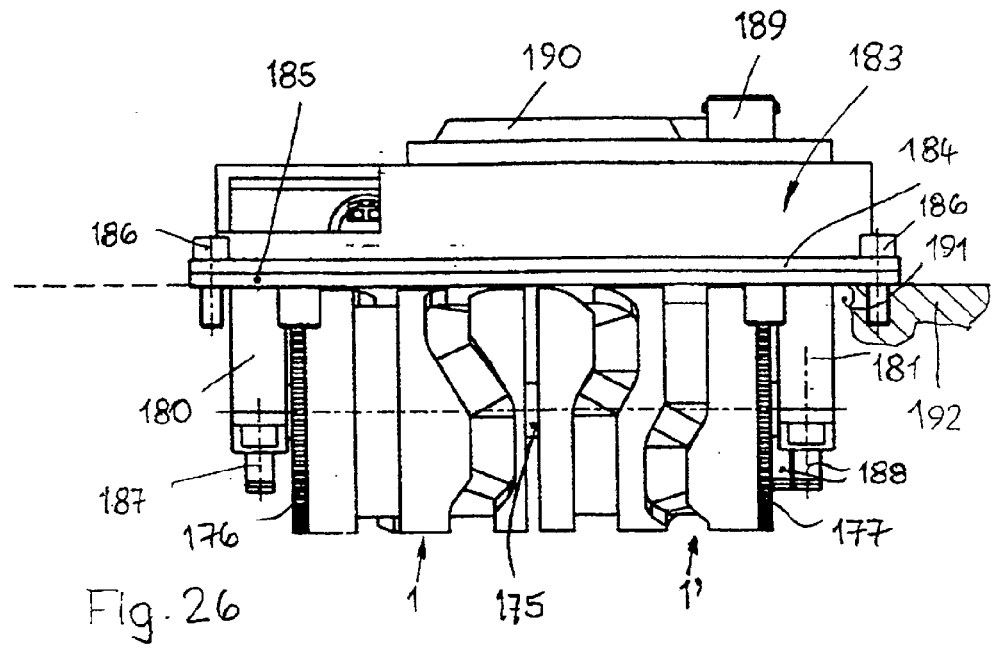
FIG. 26 illustrates a side view of the control unit of a further embodiment of the control device according to the invention.

In the mounted position, the recesses 197,198 at the end faces of the shift drums 1, 1' facing away from one another are filled with oil. The housing 193 with valves and the electronic controls arranged therein is positioned outside of the gearbox housing 192, as illustrated in FIG. 26. The oil supply is realized by axial channels (not illustrated) in the axle 175. Radial transverse bores branch off the axial channels at the level of the recesses 197, 198 via which the oil, axially supplied into the axle 175, can reach the recesses 197, 198.

Figure 30:
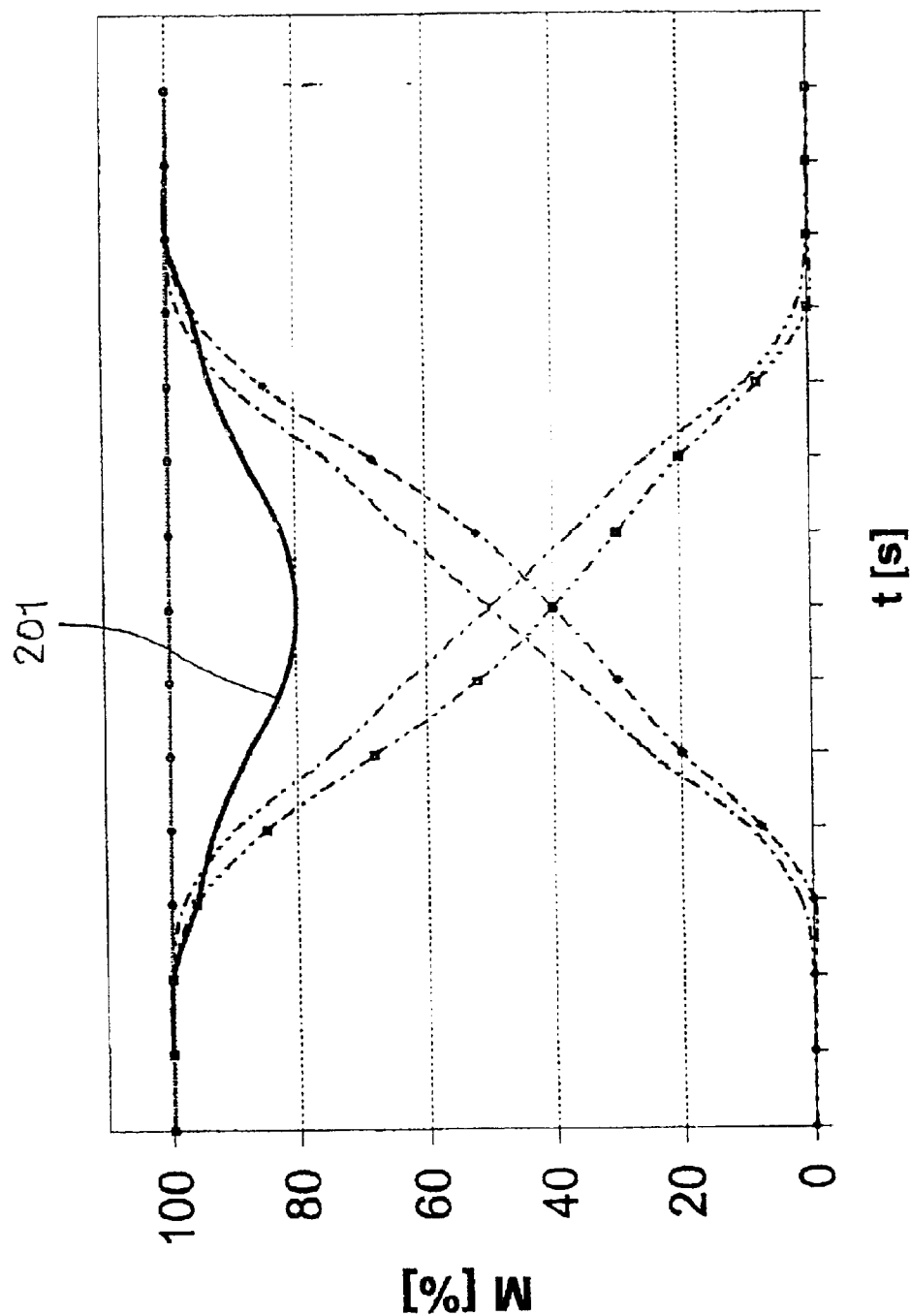
FIG. 30 shows the course of the moment of the twin clutch according to FIGS. 14 to 16.

The control device, as illustrated in FIGS. 26 to 29, is of a very compact configuration. The two coaxially positioned shift drums 1, 1' require only minimal mounting space. Since the control curves 65, 65' can be used for rotation of the selector shaft as well as for its axial movement, this configuration of the control curves contributes to a very compact configuration of the control device. FIG. 30 shows a torque-time diagram of the twin clutch control as illustrated, for example, in FIGS. 4 and 26–29. The two characteristic lines of the clutch 16, 16' overlap one another in order to prevent a negative moment, i.e., load change reactions of the motor vehicle. The example according to FIG. 30 shows an embodiment with a moment course during the clutch process wherein the clutch 16 (FIG. 4) opens and the other clutch 16' closes. The total moment, characterized by the characteristic line 201, depends on the wear and the tolerances of the two clutches 16, 16'. Accordingly, for both clutches two characteristic lines with minimum and maximum values for the torque, as a function of the clutch stroke, are provided. When the clutch is closed, the other clutch is opened. Accordingly, the torque to be transmitted by one clutch is 0% and that of the other clutch is 100%. During the shifting process the total moment is reduced only in the range between 80% and 100%, as indicated by the characteristic line 201.

While specific embodiments of the invention have been shown and described in detail to illustrate the inventive principles, it will be understood that the invention may be embodied otherwise without departing from such principles.

What is claimed is:

1. A control device for semiautomatic gearshifting mechanisms of motor vehicles, the control device comprising:
   at least one rotatable shifting element configured to act on a selector shaft of a gearshifting mechanism so as to rotate and axially move the selector shaft for selecting a gutter and shifting a gear;
   a switching valve actuating the at least one shifting element for rotating the selector shaft and for axially moving the selector shaft;
   wherein the at least one shifting element has at least one rotary piston arranged rotatably in a pressure chamber of the control device.

2. The control device according to claim 1, wherein a rotary path of the rotary piston is limited by at least one stop arranged in the pressure chamber.

3. The control device according to claim 1, wherein the at least one shifting element has an axle and wherein the rotary piston is fixedly connected to the axle for common rotation with the axle.

4. The control device according to claim 1, wherein the rotary piston and the at least one shifting element are positioned axially adjacent to one another.

5. A control device for semiautomatic gearshifting mechanisms of motor vehicles, the control device comprising:
   at least one rotatable shifting element configured to act on a selector shaft of a gearshifting mechanism so as to rotate and axially move the selector shaft for selecting a gutter and shifting a gear;
   at least one switching valve actuating the at least one shifting element for rotating the selector shaft and for axially moving the selector shaft;
   wherein two of the at least one shifting elements are provided which are assigned to different gears of the gearshift mechanism;
   a clutch for each one of the two shifting elements.

6. The control device according to claim 5, wherein the at least one shifting element is a shift drum comprising at least one control curve.

7. The control device according to claim 6, wherein the at least one control curve is a groove in a mantle of the at least one shifting element.

8. The control device according to claim 6, wherein the control curve extends about a circumference of the shift drum.

9. The control device according to claim 6, comprising at least one sliding block connected to the selector shaft and engaging the at least one control curve.

10. The control device according to claim 9, further comprising an arm fixedly connected to the selector shaft relative to an axial direction of the selector shaft and fixedly connected to the selector shaft so as to rotate together with the selector shaft, wherein the sliding block is connected to the arm and projects away from the arm.

11. The control device according to claim 5, wherein the at least one shifting element has at least one control curve located on a mantle of the at least one shifting element, wherein the at least one control curve has first curve sections ascending and descending in the circumferential direction of the cylinder mantle and second curve sections ascending and descending in a transverse direction to the circumferential direction.

12. The control device according to claim 11, comprising at least one sliding block engaging the at least one control curve, wherein the at least one sliding block, when moving in the first curve sections, rotates the selector shaft about an axis of the selector shaft.

13. The control device according to claim 11, comprising at least one sliding block engaging the at least one control curve, wherein the at least one sliding block, when moving in the second curve sections, axially moves the selector shaft.

14. The control device according to claim 11, wherein the at least one control curve is a groove in the mantle of the at least one shifting element.

15. The control device according to claim 14, wherein the groove has a bottom and wherein the second curve sections are provided on the bottom of the groove.

16. The control device according to claim 5, further comprising a locking device configured to lock the selector shaft in a rotary position corresponding to a shifted gear of the gear shifting mechanism.

17. The control device according to claim 16, wherein the locking device comprises at least one locking counter member, fastened on the selector shaft, and a locking member engaging the at least one locking counter member.

18. The control device according to claim 17, wherein the at least one locking counter member comprises locking depressions corresponding to a number of possible rotary positions of the selector shaft.

19. The control device according to claim 18, wherein the locking depressions have a length in an axial direction of the selector shaft matching at least a maximum displacement stroke of the selector shaft.

20. The control device according to claim 17, wherein the locking member is a pressure-loaded locking bolt.

21. The control device according to claim 17, wherein the locking device comprises at least one pressure spring pressure-loading the locking member.

22. The control device according to claim 17, wherein the locking member is loaded by a pressure medium.

23. The control device according to claim 5, comprising a common axle, wherein the two shifting elements are seated on the common axle.

24. The control device according to claim 5, wherein each one of the two shifting elements has one of the at least one switching valve correlated therewith.

25. The control device according to claim 5, further comprising a safety device configured to prevent the clutches from closing simultaneously.

26. The control device according to claim 25, wherein the safety device has two pressure control valves, wherein one of the two pressure control valves is arranged upstream of one of the clutches, respectively.

27. A control device for semiautomatic gearshifting mechanisms of motor vehicles, the control device comprising:
at least one rotatable shifting element configured to act on a selector shaft of a gearshifting mechanism so as to rotate and axially move the selector shaft for selecting a gutter and shifting a gear;
wherein the at least one rotatable shifting element each has a single switching valve actuating the at least one shifting element for rotating the selector shaft and for axially moving the selector shaft;
wherein the at least one shifting element has an end face recess.

28. The control device according to claim 27, comprising at least one pressure medium line opening into the end face recess.

29. The control device according to claim 28, wherein the at least one shifting element has a common axle and wherein the pressure medium line extends through the common axle.

30. A control device for semiautomatic gearshifting mechanisms of motor vehicles, the control device comprising:
at least one rotatable shifting element configured to act on a selector shaft of a gearshifting mechanism so as to rotate and axially move the selector shaft for selecting a gutter and shifting a gear;
a switching valve actuating the at least one shifting element for rotating the selector shaft and for axially moving the selector shaft;
wherein the at least one shifting element has an end face recess;
wherein the at least one shifting element has at least one rotary piston arranged rotatably in a pressure chamber of the control device, wherein a rotary path of the rotary piston is limited by at least one stop arranged in the end face recess and fixedly connected on a common axle of the at least one shifting element.

31. A control device for semiautomatic gearshifting mechanisms of motor vehicles, the control device comprising:
at least one rotatable shifting element configured to act on a selector shaft of a gearshifting mechanism so as to rotate and axially move the selector shaft for selecting a gutter and shifting a gear;
a switching valve actuating the at least one shifting element for rotating the selector shaft and for axially moving the selector shaft;
comprising a twin clutch and a worm gear mechanism for actuating the twin clutch.

32. The control device according to claim 31, wherein the twin clutch has two clutch discs moveable simultaneously in a same direction.

33. The control device according to claim 32, wherein the worm gear mechanism has a spindle rotatingly engaging the clutch discs.

34. The control device according to claim 33, comprising an adjusting device for at least one of the two clutch discs.

35. The control device according to claim 34, wherein each one of the two clutch discs comprises one of the adjusting devices.

36. The control device according to claim 34, wherein the adjusting device has a pressure-loaded tooth-shaped locking bolt and the at least one of the two clutch discs has a toothing engaged by the tooth-shaped locking bolt.

37. The control device according to claim 36, wherein the tooth-shaped locking bolt is supported on the spindle.

38. A control device for semiautomatic gearshifting mechanisms of motor vehicles, the control device comprising:
- at least one rotatable shifting element configured to act on a selector shaft of a gearshifting mechanism so as to rotate and axially move the selector shaft for selecting a gutter and shifting a gear;
- a switching valve actuating the at least one shifting element for rotating the selector shaft and for axially moving the selector shaft;
- wherein two of the at least one shifting elements are provided which are assigned to different gears of the gearshift mechanism;
- wherein the two shifting elements have axes extending parallel to one another.

* * * * *